US012614510B2

(12) United States Patent
Shin et al.

(10) Patent No.: US 12,614,510 B2
(45) Date of Patent: Apr. 28, 2026

(54) DISPLAY DEVICE, ELECTRONIC DEVICE INCLUDING THE SAME, AND METHOD OF MANUFACTURING THE SAME

(71) Applicant: Samsung Display Co., Ltd., Yongin-si (KR)

(72) Inventors: Dong Hee Shin, Yongin-si (KR); Sun Kwun Son, Yongin-si (KR); Na Hyeon Cha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/097,621

(22) Filed: Apr. 1, 2025

(65) Prior Publication Data

US 2026/0011292 A1 Jan. 8, 2026

(30) Foreign Application Priority Data

Jul. 3, 2024 (KR) ........................ 10-2024-0087526

(51) Int. Cl.
*G09G 3/32* (2016.01)

(52) U.S. Cl.
CPC ....... *G09G 3/32* (2013.01); *G09G 2300/0426* (2013.01); *G09G 2360/14* (2013.01)

(58) Field of Classification Search
CPC ............. G09G 3/32; G09G 2300/0426; G09G 2360/14; G09G 3/3208; G09G 2310/08; G09G 2330/021; G09G 2370/08; G09G 5/006; G09G 3/2096; G09G 5/18
See application file for complete search history.

(56) References Cited

U.S. PATENT DOCUMENTS 10,860,135 B2 12/2020 Yoo et al.
11,075,252 B2 7/2021 Cha et al.
2015/0062076 A1* 3/2015 Pan ......................... G06F 3/042 345/174
2020/0192522 A1* 6/2020 Reynolds ............. H03K 17/941
2020/0357324 A1* 11/2020 Park ...................... G09G 3/3266
2024/0111381 A1* 4/2024 Song .................. G06V 40/1318

FOREIGN PATENT DOCUMENTS

KR 10-2512914 B1 3/2023

* cited by examiner

*Primary Examiner* — Pegeman Karimi
(74) *Attorney, Agent, or Firm* — Womble Bond Dickinson (US) LLP

(57) ABSTRACT

A display device includes: a first pixel; a first photo sensor adjacent to the first pixel in a first direction and including a photo sensor circuit; a second pixel adjacent to the first pixel in a second direction different from the first direction; a second photo sensor adjacent to the second pixel in the first direction and including a photo sensor circuit; a power line entirely extending in the first direction, configured to receive a reset voltage, and directly connected to the photo sensor circuit of the second photo sensor; a power line connection electrode in an island shape and directly connected to the photo sensor circuit of the first photo sensor; and a power line extension electrode connected to the power line, the power line extension electrode entirely extending in the second direction, the power line extension electrode being directly connected to the power line connection electrode.

20 Claims, 22 Drawing Sheets

DISPLAY DEVICE, ELECTRONIC DEVICE INCLUDING THE SAME, AND METHOD OF MANUFACTURING THE SAME

CROSS-REFERENCE TO RELATED APPLICATION

The present application claims priority to and the benefit of Korean Patent Application No. 10-2024-0087526, filed on Jul. 3, 2024, in the Korean Intellectual Property Office, the entire disclosure of which is incorporated herein by reference.

BACKGROUND

1. Field

Aspects of some embodiments of the present disclosure generally relate to a display device, an electronic device, and a method of manufacturing the same.

2. Description Related Art

With the development of information technologies, the importance of a display device which provide a connection medium between users and information has increased. Accordingly, display devices such as liquid crystal display devices and organic light emitting display devices are increasingly being used.

A photo sensor, a pixel, and the like may be located in a display device. The display device may control a function of the display device (e.g., adjust a luminance of an image displayed in the display device) or provide a biometric authentication function (e.g., a fingerprint authentication function), based on an amount of light incident through the photo sensor.

Meanwhile, as the size of each of the photo sensor and the pixel becomes smaller, a technique for efficiently arranging a power line which supplies power to the photo sensor and the pixel has been studied.

The above information disclosed in this Background section is only for enhancement of understanding of the background and therefore the information discussed in this Background section does not necessarily constitute prior art.

SUMMARY

Aspects of some embodiments include a display device, an electronic device, and a method of manufacturing the same, in which a power line can be relatively efficiently arranged.

According to some embodiments of the present disclosure, a display device includes: a first pixel; a first photo sensor located adjacent to the first pixel in a first direction, the first photo sensor including a photo sensor circuit; a second pixel located adjacent to the first pixel in a second direction, wherein the second direction is different from the first direction; a second photo sensor located adjacent to the second pixel in the first direction, the second photo sensor including a photo sensor circuit; a power line entirely extending in the first direction, the power line having a reset voltage applied thereto, the power line being directly connected to the photo sensor circuit of the second photo sensor; a power line connection electrode in an island shape, the power line connection electrode being directly connected to the photo sensor circuit of the first photo sensor; and a power line extension electrode connected to the power line, the power line extension electrode entirely extending in the second direction, the power line extension electrode being directly connected to the power line connection electrode.

According to some embodiments, the power line may be a sixth power line. According to some embodiments, each of the first photo sensor and the second photo sensor may include a light receiving element. According to some embodiments, each of the photo sensor circuit of the first photo sensor and the photo sensor circuit of the second photo sensor may include: a first sensor transistor including a gate electrode connected to the light receiving element at a sixth node, and the first sensor transistor being connected to a fourth power line; a second sensor transistor connected between the first sensor transistor and a sensing line; and a third sensor transistor including a gate electrode connected to a reset control line, the third sensor transistor being connected between the sixth node and the sixth power line. According to some embodiments, the light receiving element may be connected to the sixth node and a second power line.

According to some embodiments, the sixth power line may include a first source drain electrode connected to a semiconductor layer of the third sensor transistor.

According to some embodiments, at least a portion of the sixth node may be configured with the first source drain electrode.

According to some embodiments, the power line extension electrode may be configured with a second source drain electrode. According to some embodiments, the second source drain electrode may be located on the first source drain electrode.

According to some embodiments, at least a portion of the sixth node may be configured with the second source drain electrode.

According to some embodiments, the sensing line may include a third source drain electrode. According to some embodiments, the third source drain electrode may be located on the second source drain electrode.

According to some embodiments, the sensing line may include a connection electrode configured with the first source drain electrode, a connection electrode configured with the second source drain electrode, and a connection electrode configured with the third source drain electrode.

According to some embodiments, the connection electrode configured with the first source drain electrode and the connection electrode configured with the second source drain electrode in the sensing line may be located inside each of the photo sensor circuit of the first photo sensor and the photo sensor circuit of the second photo sensor.

According to some embodiments, the connection electrode configured with the third source drain electrode in the sensing line may be located between the photo sensor circuit of the first photo sensor and the photo sensor circuit of the second photo sensor.

According to some embodiments, each of the first pixel and the second pixel may include a pixel circuit and a light emitting element connected to the pixel circuit. According to some embodiments, the pixel circuit may include: a first pixel transistor connected between a first node and a second node, the first pixel transistor including a gate electrode connected to a fourth node; a second pixel transistor configured to switch an electrical connection between the first node and a data line in response to a first scan signal applied to a first scan line; a third pixel transistor connected between the second node and the fourth node; a fourth pixel transistor connected between the fourth node and a third power line; a fifth pixel transistor connected between a first power line and the first node; a sixth pixel transistor connected between the second node and a fifth node; a seventh pixel transistor connected between the fifth node and the fourth power line; an eighth pixel transistor connected between a fifth power line and the first node; a first capacitor including one electrode connected to the fourth node and the other electrode connected to the first power line; and a second capacitor including one electrode connected to the fourth node and the other electrode connected to the first scan line. According to some embodiments, the light emitting element may be connected between the fifth node and the second power line.

According to some embodiments, each of the first, second, and fifth to eighth pixel transistors and the first and second sensor transistors may include a first semiconductor layer.

According to some embodiments, each of the third and fourth pixel transistors and the third sensor transistor may include a second semiconductor layer. According to some embodiments, the second semiconductor layer may be located on the first semiconductor layer.

According to some embodiments, the first pixel and the first photo sensor may be located on a first pixel row, and the second pixel and the second photo sensor may be located on a second pixel row. According to some embodiments, the first pixel and the second pixel may be located on a first pixel column, and the first photo sensor and the second photo sensor may be located on a sensor column.

According to some embodiments of the present disclosure, there is provided an electronic device comprising the display device, wherein the electronic device is one of a mobile phone, a personal digital assistant (PDA), a smartphone, a wireless modulator-demodulator (MODEM), or a notebook computer.

According to some embodiments of the present disclosure, there is provided a method of manufacturing a display device including a first photo sensor on a first pixel row and a second photo sensor on a second pixel row, the method including: forming a first semiconductor layer on a substrate, wherein the first semiconductor layer constitutes a semiconductor layer of each of a first sensor transistor and a second sensor transistor of each of the first photo sensor and the second photo sensor; forming a first gate electrode layer on the first semiconductor layer, wherein the first gate electrode layer constitutes a gate electrode of each of the first sensor transistor and the second sensor transistor; forming a second semiconductor layer on the first gate electrode layer, wherein the second semiconductor layer constitutes a semiconductor layer of a third sensor transistor of each of the first photo sensor and the second photo sensor; forming a second gate electrode layer on the second semiconductor layer, wherein the second gate electrode layer constitutes a gate electrode of the third sensor transistor; forming a first source drain electrode on the second gate electrode layer, wherein the first source drain electrode includes a power line which extends in a first direction on the second pixel row and is connected to the second semiconductor layer and a power line connection electrode which is located on the first pixel row and is connected to the second semiconductor layer; and forming a second source drain electrode on the first source drain electrode, wherein the second source drain electrode includes a power line extension electrode extending in a second direction different from the first direction, the power line extension electrode being connected to the power line and the power line connection electrode.

According to some embodiments, the first semiconductor layer may include a silicon semiconductor.

According to some embodiments, the second semiconductor layer may include an oxide semiconductor.

According to some embodiments, the method may further include forming a third source drain electrode on the second source drain electrode. According to some embodiments, the third source drain electrode may extend in the first direction, and be connected to the power line extension electrode.

According to some embodiments, the first photo sensor and the second photo sensor may be commonly connected to one sensing line. According to some embodiments, the sensing line may be configured with the first source drain electrode, the second source drain electrode, and the third source drain electrode.

According to some embodiments, the first source drain electrode and the second source drain electrode may be located inside each of the first photo sensor and the second photo sensor. According to some embodiments, the third source drain electrode may connect the first photo sensor and the second photo sensor to each other.

BRIEF DESCRIPTION OF THE DRAWINGS

Aspects of some embodiments of the present disclosure will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
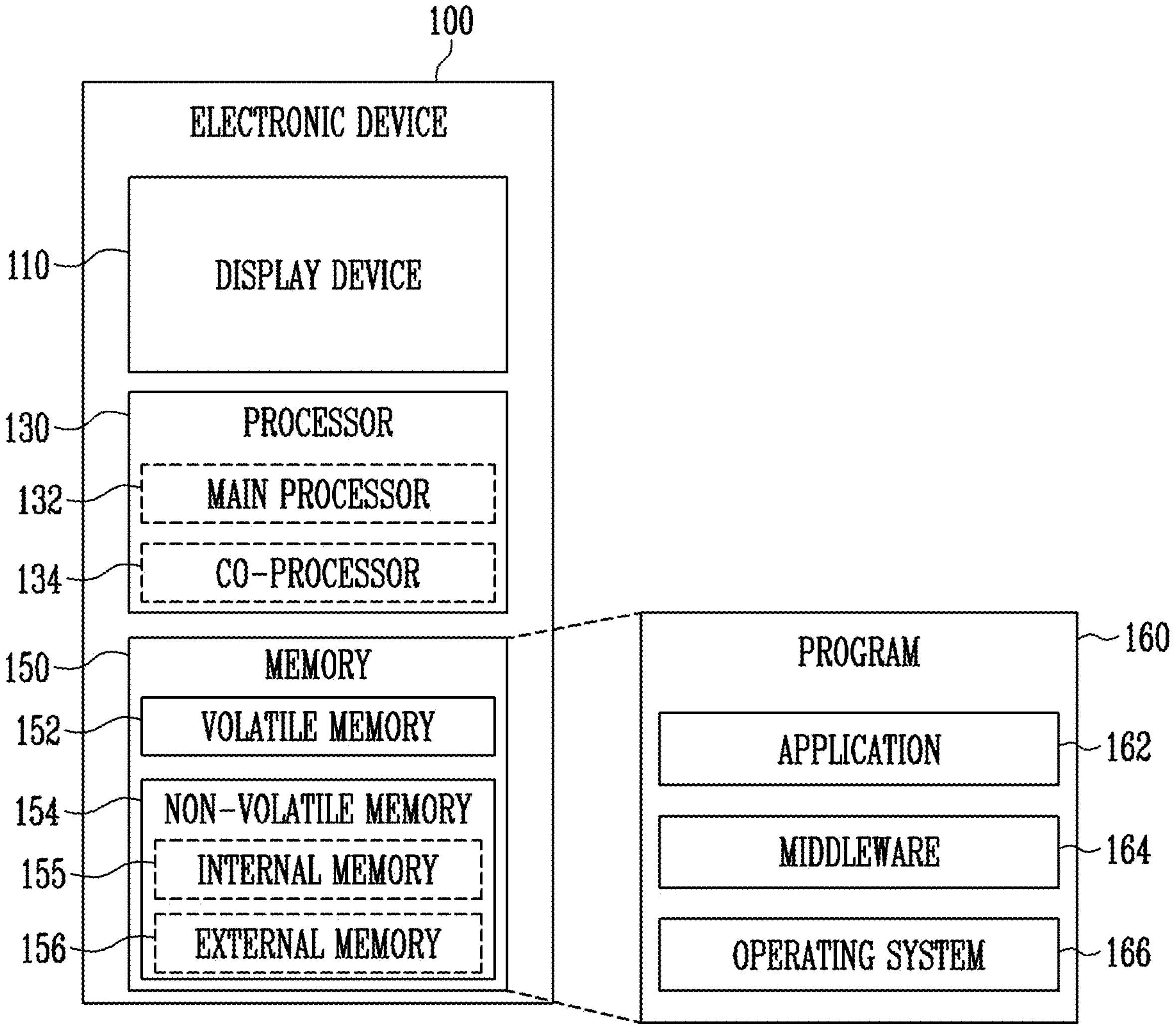
FIG. 1 is a schematic system diagram of an electronic device according to some embodiments of the present disclosure.

Hereinafter, aspects of some embodiments are described in more detail with reference to the accompanying drawings so that those skilled in the art may easily practice the present disclosure. Embodiments according to the present disclosure may be implemented in various different forms and is not limited to the disclosed embodiments described in the present specification.

Description of some parts or components that may not be necessary to enable a person having ordinary skill in the art to make, use, or understand embodiments according to the present disclosure may be omitted to more clearly describe aspects of some embodiments of the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially" is omitted.

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

The terms "under," "beneath," "on," "above," and the like are used to describe a relationship between components illustrated in a drawing. The terms are relative and are described with reference to a direction indicated in the drawing.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

Hereinafter, aspects of some embodiments of the present disclosure will be described in more detail with reference to the accompanying drawings.

FIG. 1 is a schematic system diagram of an electronic device 100 according to some embodiments of the present disclosure.

Referring to FIG. 1, the electronic device 100 according to some embodiments of the present disclosure may include a display device 110, a processor 130, a memory 150, and the like.

The display device 110 may visually provide or display information to the outside (e.g., a user) of the electronic device 100. The display device 110 may include, for example, a display panel, a driving circuit, and the like. The display device 110 according to some embodiments of the present disclosure may include a touch sensor adapted to sense a touch and/or a pressure sensor adapted to measure an intensity of a force incurred by the touch.

The processor 130 may control at least another component (e.g., a hardware or software component) of the electronic device 100, which is connected to the processor 130, by executing software (e.g., a program 160), and perform various data processing or calculations. According to some embodiments of the present disclosure, as at least a portion of the data processing or calculations, the processor 130 may store, in a volatile memory 152, data received from another component (e.g., the display device 110), process commands or data, stored in the volatile memory 152, and store result data in a non-volatile memory 154. According to some embodiments of the present disclosure, the processor 130 may include a main processor 132 (e.g., a central processing unit or an application processor) or a co-processor 134 (e.g., a graphic processing unit (GPU), a neural processing unit (NPU), an image signal processor, a sensor hub processor, a communication processor, or the like) which can operate independently from the main processor 132 or together with the main processor 132. For example, the electronic device 100 includes the main processor 132 and the co-processor 134, the co-processor 134 may be adapted to use low power as compared with the main processor 132 or to be specialized in a designated function. The co-processor 134 may be implemented separately from the main processor 132 or as a portion of the main processor 132.

The co-processor 134 may control, for example, at least some of functions or states related to at least one component (e.g., the display device 110) among components of the electronic device 100, instead of the main processor 132 while the main processor 132 is in an inactive (e.g., sleep) state or together with the main processor 132 while the main processor 132 is in an active (e.g., application execution)

state. According to some embodiments of the present disclosure, the co-processor 134 (e.g., an image signal processor or a communication processor) may be implemented as a portion of another component (e.g., a camera module, a communication module, or the like) functionally related to the co-processor 134. According to some embodiments of the present disclosure, the co-processor 134 (e.g., a neural processing unit) may include a hardware structure specialized in processing of an artificial intelligence model. The artificial intelligence model may be generated through machine learning.

The memory 150 may store various data used by at least one component (e.g., the processor 130) of the electronic device 100. The data may include, for example, software (e.g., the program 160) and input data or output data for a command related to the software. The memory 150 may include the volatile memory 152 or the non-volatile memory 154. The non-volatile memory 154 may include an internal memory 155. The non-volatile memory 154 may further include an external memory 156.

The program 160 may be stored as software in the memory 150, and include, for example, an application 162, a middleware 164, an operating system 166, and the like.

The electronic device 100 according to some embodiments of the present disclosure may be designated as a mobile station, a mobile equipment (ME), a user equipment (UE), a user terminal (UT), a subscriber station (SS), a wireless device, a handheld device, an access terminal (AT), or the like. The electronic device 100 according to some embodiments of the present disclosure may be, for example, a device having a communication function, such as a mobile phone, a personal digital assistant (PDA), a smartphone, a wireless modulator-demodulator (MODEM), or a notebook computer.

The electronic device 100 according to some embodiments of the present disclosure may include a power management module configured to manage power supplied to the electronic device 100. The power management module may be implemented as, for example, at least a portion of a power management integrated circuit (PMIC).

At least some of the components of the electronic device 100 according to some embodiments of the present disclosure may be connected to each other and exchange signals (e.g., commands, data or the like) therebetween through an inter-peripheral communication scheme (e.g., a bus, a general purpose input and output (GPIO), a serial peripheral interface (SPI), a mobile industry processor interface (MIPI), or the like).

Figure 2:
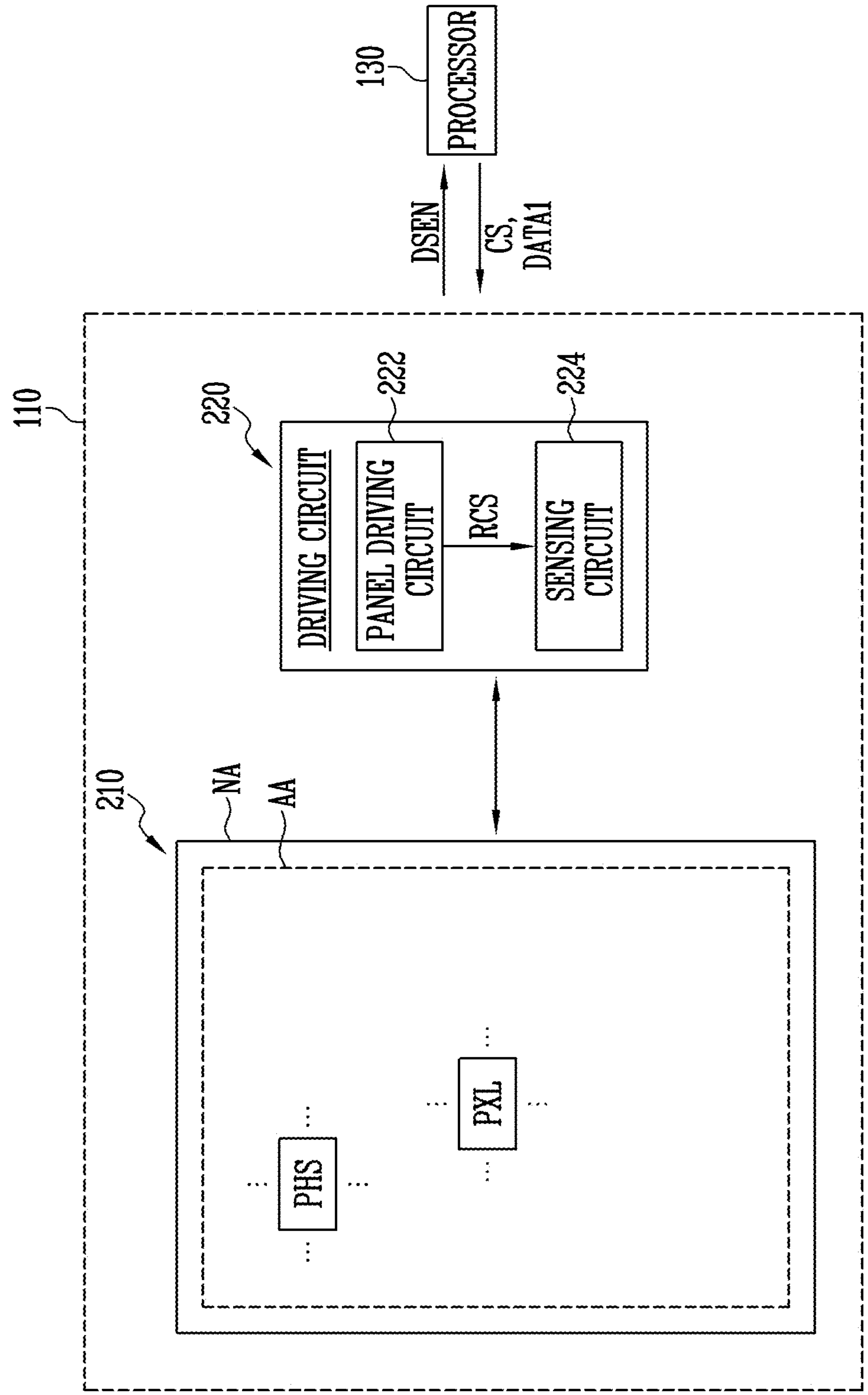
FIG. 2 is a diagram illustrating a display device and a processor according to some embodiments of the present disclosure.

FIG. 2 is a diagram illustrating a display device 110 and a processor 130 according to some embodiments of the present disclosure.

Referring to FIG. 2, the display device 110 according to some embodiments of the present disclosure may include a display panel 210 and a driving circuit 220.

The display panel 210 may include a display area AA in which at least one pixel PXL is located and a non-display area NA located in a peripheral area (e.g., an edge area, surrounding, in a periphery, or outside a footprint) of the display area AA. The at least one pixel PXL may be located in the display area AA. At least one photo sensor PHS may be located in the display area AA.

The pixel PXL may be configured to display an image in the display area AA. The pixel PXL may emit light with a luminance corresponding to a voltage (e.g., a data voltage) input from the driving circuit 220.

The photo sensor PHS may be configured to detect a light receiving amount. The photo sensor PHS may include a light receiving element. An intensity of a current flowing through the photo sensor PHS (or flowing through the light receiving element) may vary according to an intensity of light incident onto the photo sensor PHS. The light incident onto the photo sensor PHS may include reflected light. The reflected light may be light generated as light emitted from the display device 110 is reflected from an external object (e.g., a finger surface of a person, or the like). According to some embodiments, the intensity of the current flowing through the photo sensor PHS may vary according to an intensity of the reflected light (e.g., an amount of the reflected light).

At least one pin (e.g., at least one pad) may be located in the non-display area NA. The display panel 210 and at least one component of the driving circuit 220 may be electrically connected to each other through the pin.

The driving circuit 220 may include a panel driving circuit 222 and a sensing circuit 224.

The panel driving circuit 222 may include a data driving circuit configured to output a data voltage, a scan driving circuit configured to supply a scan signal, an emission driving circuit configured to supply an emission control signal, and the like. The panel driving circuit 222 may include, for example, may include a timing controller configured to control operation timings of the data driving circuit, the scan driving circuit, and the emission driving circuit.

The sensing circuit 224 may be configured to sense the photo sensor PHS located in the display panel 210.

The panel driving circuit 222 may output a readout circuit control signal RCS. The sensing circuit 224 may receive the readout circuit control signal RCS. A timing (or a length of a period) at which the sensing circuit 224 senses (e.g., reads out) the photo sensor PHS may be controlled by the readout circuit control signal RCS.

The sensing circuit 224 may convert a value obtained by sensing the photo sensor PHS into a corresponding digital value. According to some embodiments, the sensing circuit 224 may include an analog-to-digital converter configured to convert an analog voltage value into a digital value DSEN corresponding thereto. The sensing circuit 224 may output the converted digital value DSEN. The processor 130 may receive the digital value DSEN.

The processor 130 may output a control signal CS for controlling an operation timing of the driving circuit 220. The processor 130 may output first image data DATA1 to the driving circuit 220.

The driving circuit 220 may receive the control signal CS and the first image data to display an image through the pixel PXL of the display panel 210, or detect a light receiving amount through the photo sensor PHS of the display panel 210.

The processor 130 according to some embodiments of the present disclosure may generate an image, based on the received digital value DSEN.

Figure 3:
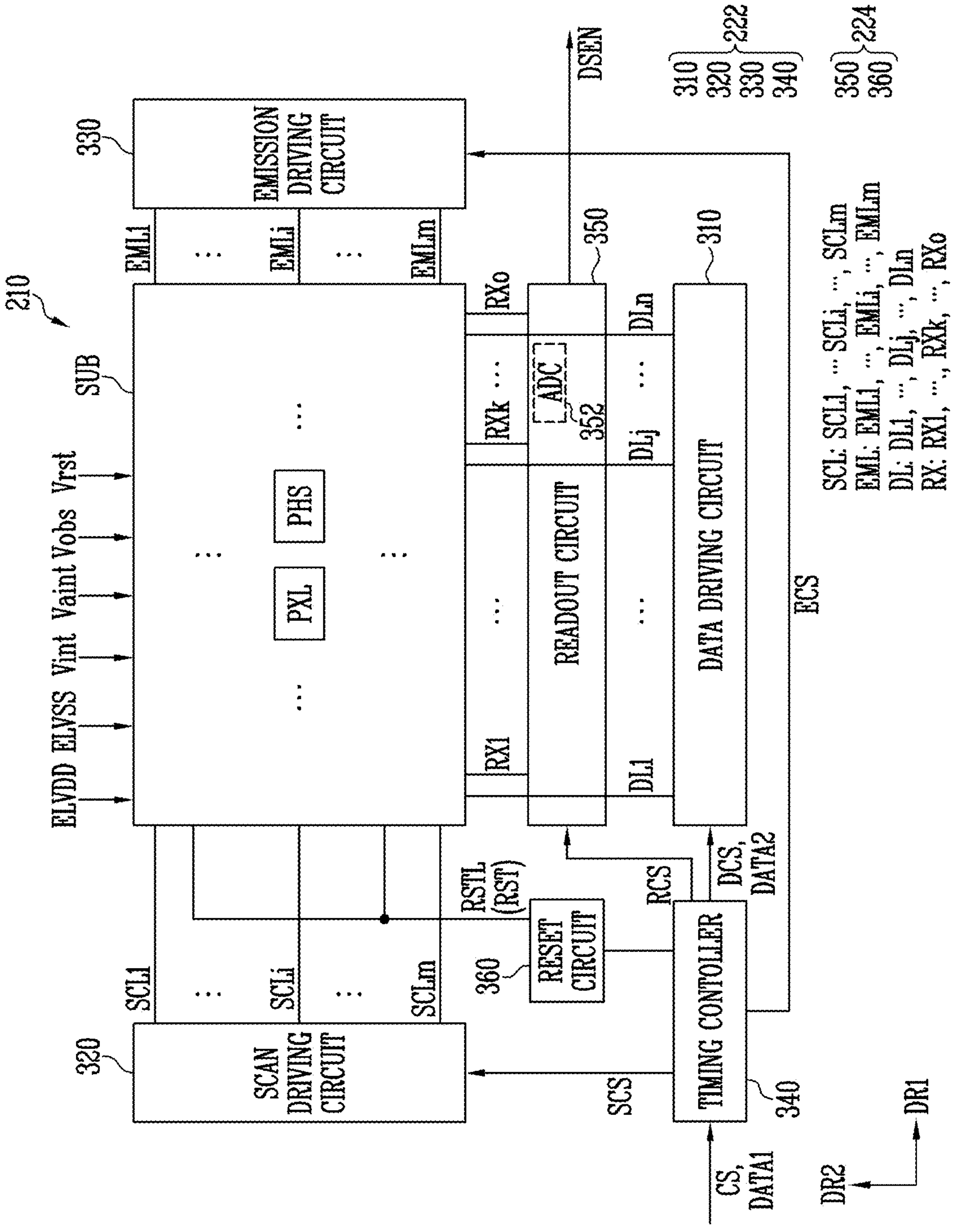
FIG. 3 is a system diagram of a display device according to some embodiments of the present disclosure.

FIG. 3 is a system diagram of a display device 110 (see FIG. 1) according to some embodiments of the present disclosure.

Referring to FIG. 3, the display device 110 (see FIG. 1) according to some embodiments of the present disclosure may include a display panel 210, a data driving circuit 310, a scan driving circuit 320, an emission driving circuit 330, a timing controller 340, a readout circuit 350, a reset circuit 360, and the like.

A panel driving circuit 222 may include the data driving circuit 310, the scan driving circuit 320, the emission driving circuit 330, the timing controller 340, and the like. A sensing circuit 224 may include the readout circuit 350, the reset circuit 360, and the like.

The display panel 210 may include a substrate SUB. At least one pixel PXL may be located on the substrate SUB. At least one photo sensor PHS may be located on the substrate SUB. At least one power voltage may be supplied to the display panel 210. The power voltage may indicate a voltage commonly input to a plurality of pixels PXL or indicate a voltage commonly input to a plurality of photo sensors PHS.

The power voltage may include, for example, a first power voltage ELVDD, a second power voltage ELVSS, a third power voltage Vint, a fourth power voltage Vaint, a fifth power voltage Vobs, a sixth power voltage Vrst, and the like. The power voltage may be commonly input to the plurality of pixels PXL and/or the plurality of photo sensors PHS, or be referred to as a common voltage. The power voltage may be generated, for example, in a power management module.

A plurality of data lines DL or DL1 to DLn (n is an integer of 2 or more) may be located in the display panel 210. The plurality of data lines DL1 to DLn may be located in the display panel 210 while extending in a second direction DR2. The second direction DR2 may be, for example, a direction (e.g., a column direction) correcting an upper side and a lower side of the display panel 210 to each other. In another example, the second direction DR2 may be a direction (e.g., a row direction) connecting a left side and a right side of the display panel 210 to each other. Hereinafter, for convenience of description, a case where the second direction DR2 is a direction connecting the upper side and the lower side of the display panel 210 to each other will be described as an example. However, embodiments of the present disclosure are not limited thereto.

A plurality of scan lines SCL or SCL1 to SCLm (m is an integer of 2 or more) may be located in the display panel 210. The plurality of scan lines SCL1 to SCLm may be located in the display panel 210 while extending a first direction DR1. The first direction DR1 may be, for example, a direction connecting the left side and the right side of the display panel 210 to each other. According to some embodiments, the first direction DR1 may be a direction connecting the upper side and the lower side of the display panel 210 to each other. The first direction DR1 may be, for example, a direction perpendicular to the second direction DR2. Hereinafter, for convenience of description, a case where the first direction DR1 is a direction connecting the left side and the right side of the display panel 210 to each other will be described as an example. However, embodiments of the present disclosure are not limited thereto.

Meanwhile, the term "being located while extending in the second direction DR2" may mean being located while entirely extending in the direction connecting the upper side and the lower side to each other, and does not exclude being located while partially extending in a direction different from the second direction DR2. For example, according to some embodiments of the present disclosure, at least one data line among the plurality of data lines DL1 to DLn may be designed to extending while partially detouring in a direction different from the second direction DR2 so as to avoid a specific area. The term "being located while extending in the first direction DR1" may be understood as the same meaning as the term "being located while extending in the second direction DR2."

A plurality of emission control lines EML or EML1 to EMLm may be located in the display panel 210. The plurality of emission control lines EML1 to EMLm may be located in the display panel 210 while extending in the first direction DR1.

A plurality of sensing lines RX or RX1 or RXo (o is an integer of 2 or more) may be located in the display panel 210. The plurality of sensing lines RX1 to RXo may be located in the display panel 210 while extending in the second direction DR2.

At least one reset control line RSTL may be located in the display panel 210. A reset control signal RST may be supplied to the reset control line RST.

The pixel PXL may be electrically connected to corresponding one of the plurality of data lines DL1 to DLn. The pixel PXL may be electrically connected to corresponding one of the plurality of scan lines SCL1 to SCLm. The pixel PXL may be electrically connected to corresponding one of the plurality of emission control lines EML1 to EMLm.

The photo sensor PHS may be electrically connected to corresponding one of the plurality of sensing lines RX1 to RXo. The photo sensor PHS may be electrically connected to the reset control line RSTL. According to some embodiments, the photo sensor PHS may be electrically connected to at least one (e.g., corresponding one) of the plurality of scan lines SCL1 to SCLm.

According to some embodiments, the plurality of pixels PXL may be arranged in a matrix type in the display panel 210. In the matrix type, the plurality of pixels PXL may be arranged in an RGBG type or be arranged in a diamond PENTILE™ structure. However, embodiments of the present disclosure are not limited thereto.

The data driving circuit 310 may be configured to supply (apply or output) a data voltage to the plurality of data lines DL1 to DLn. The data driving circuit 310 may receive a data driving circuit control signal DCS and second image data DATA2, and supply a data voltage (or data signal) corresponding to image data to the plurality of data lines DL1 to DLn in synchronization with a timing.

The scan driving circuit 320 may be configured to supply a scan signal to the plurality of scan lines SCL1 to SCLm. According to some embodiments, the scan driving circuit 320 may be configured to sequentially supply the scan signal (e.g., the scan signal having a turn-on level) to the plurality of scan lines SCL1 to SCLm, but embodiments of the present disclosure are not limited thereto. The scan driving circuit 320 may receive a scan driving circuit control signal SCS, and supply the scan signal to the plurality of scan lines SCL1 to SCLm in synchronization with a timing.

The emission driving circuit 330 may be configured to supply an emission control signal to the plurality of emission control lines EML1 to EMLm. According to some embodiments, the emission driving circuit 330 may be configured to sequentially supply the emission control signal (e.g., the emission control signal having a turn-on level) to the plurality of emission control lines EML1 to EMLm. However, embodiments of the present disclosure are not limited thereto. The emission driving circuit 330 may receive an emission driving circuit control signal ECS, and supply the emission control signal to the plurality of emission control lines EML1 to EMLm in synchronization with a timing.

The timing controller 340 may receive a control signal CS and first image data DATA1 from an outside, and generate and output the data driving circuit control signal DCS, the scan driving circuit control signal SCS, the emission driving circuit control signal ECS, the second image data DATA2, a readout circuit control signal RCS, and the like, based on the received control signal CS and the received first image data DATA1.

The readout circuit 350 may be electrically connected to the plurality of sensing lines RX1 to RXo. The readout circuit 350 may be configured to sense the plurality of photo sensors PHS through the plurality of sensing lines RX1 to RXo. For example, the readout circuit 350 may integrate a current flowing in at least one of the plurality of sensing lines RX1 to RXo (referred to as a current sensing method) or sense a voltage of at least one of the plurality of sensing lines RX1 to RXo (referred to as a voltage sensing method) according to a design of the readout circuit 350. The readout circuit 350 may include a multiplexer configured to integrate a current (or sense a voltage) of at least one of the plurality of sensing lines RX1 to RXo. Hereinafter, for convenience of description, a case where the readout circuit 350 selects the current sensing method will be described as an example, but embodiments of the present disclosure are not limited thereto.

The readout circuit 350 may include an analog-to-digital converter (ADC) 352 configured to covert a sensed analog voltage into a digital value DSEN corresponding thereto.

The reset circuit 360 may be configured to supply the reset control signal RST to the plurality of photo sensors PHS. When the reset control signal RST is supplied to a photo sensor PHS, the sixth power voltage Vrst may be applied to the photo sensor PHS such that the photo sensor PHS is initialized. A timing at which the reset circuit 360 outputs the reset control signal RST may be controlled by the timing controller 340.

One or more circuits constituting the panel driving circuit 222 may be formed or arranged in the form of an integrated circuit (IC) in the display device 110 (see FIG. 1). For example, the data driving circuit 310 may include a source driver integrated circuit (SDIC).

One or more circuits constituting the panel driving circuit 222 may be formed together in a process of forming the display panel 210. For example, the scan driving circuit 320 may be formed together in a process of forming at least one circuit element (e.g., a transistor, a capacitor, and the like) included in the pixel PXL and/or the photo sensor PHS.

The data driving circuit 310, the scan driving circuit 320, the emission driving circuit 330, and the timing controller 340 are merely sorted according to functions in the panel driving circuit 222, and two or more components may be functionally sorted in one integrated circuit. According to some embodiments, the scan driving circuit 320 and the emission driving circuit 330 may be implemented into one integrated circuit, and be functionally sorted in the integrated circuit.

The panel driving circuit 222 and the sensing circuit 224 are merely sorted according to functions in the display device 110 (see FIG. 1). According to some embodiments, the panel driving circuit 222 and the sensing circuit 224 may be implemented in different integrated circuits. However, the panel driving circuit 222 and the sensing circuit 224 may be functionally sorted in one integrated circuit in some cases.

Figure 4:
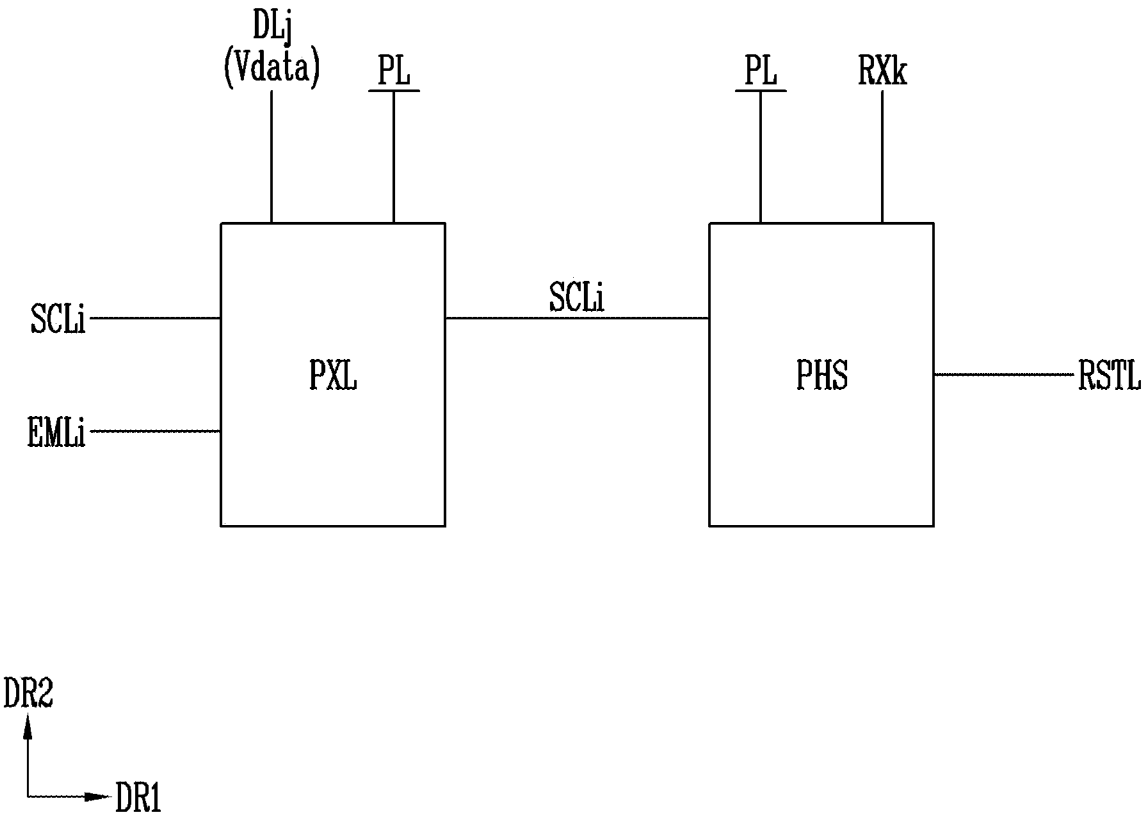
FIG. 4 is a diagram briefly illustrating a pixel and a photo sensor according to some embodiments of the present disclosure.

FIG. 4 is a diagram briefly illustrating a pixel PXL and a photo sensor PHS according to some embodiments of the present disclosure.

The pixel PXL according to some embodiments of the present disclosure may be connected to a scan line SCLi (i is an integer of 1 or more and n or less), an emission control line EMLi, a data line DLj (j is an integer of 1 or more and n or less), and a power line PL.

The photo sensor PHS according to some embodiments of the present disclosure may be connected to the power line PL, a sensing line RXk (k is an integer of 1 or more and o or less), and a reset control line RSTL.

According to some embodiments, the pixel PXL and the photo sensor PHS may be connected to one scan line SCLi. However, embodiments of the present disclosure are not limited thereto.

Figure 5:
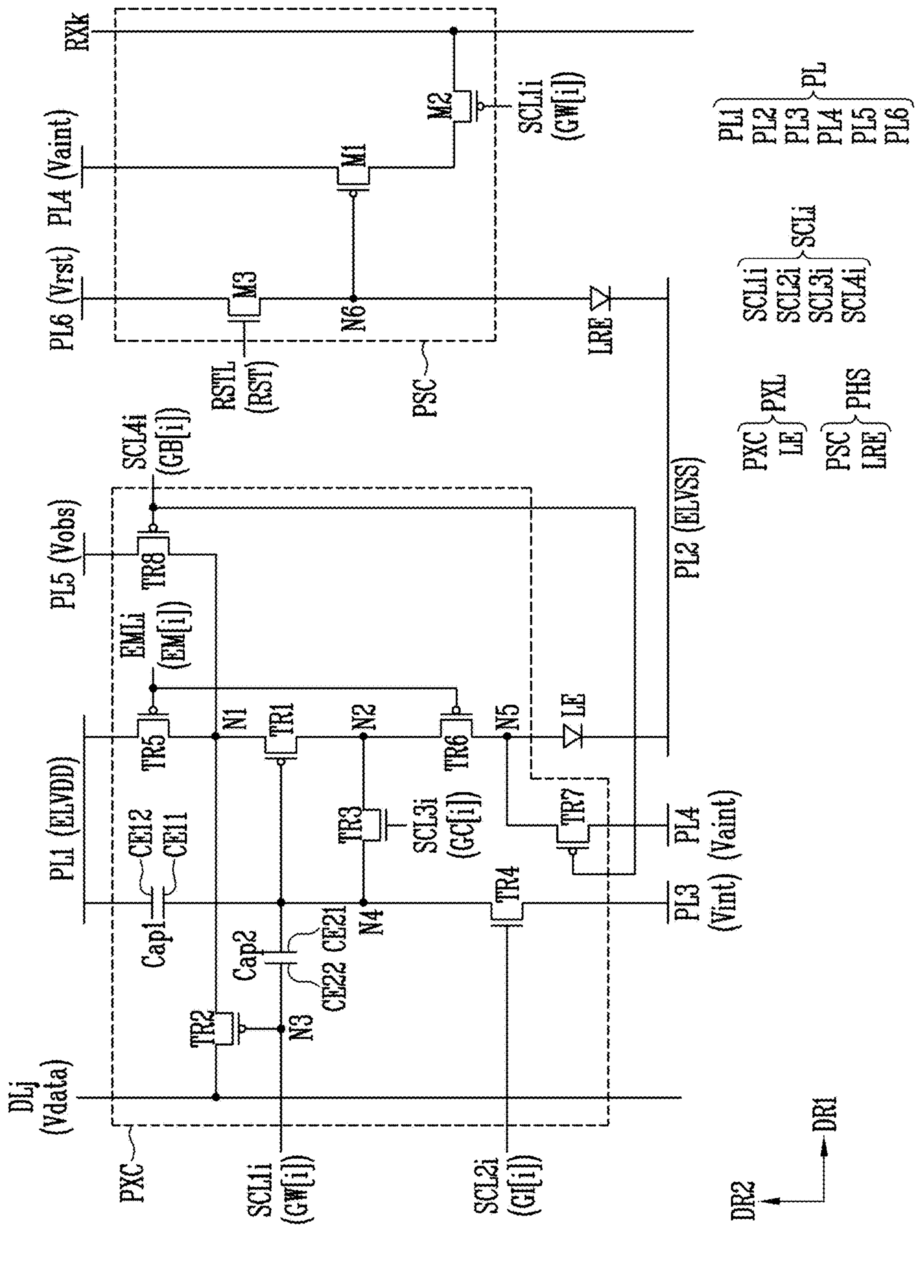
FIG. 5 is an equivalent circuit diagram illustrating aspects of the pixel and the photo sensor, which are shown in FIG. 4.

FIG. 5 is an equivalent circuit diagram illustrating aspects of the pixel PXL and the photo sensor PHS, which are shown in FIG. 4. Although FIG. 5 illustrates various components in a pixel and a photo sensor according to some embodiments, embodiments according to the present disclosure are not limited thereto, and according to some embodiments, the pixel and the photo sensor may include additional components or fewer components without departing from the spirit and scope of embodiments according to the present disclosure.

Referring to FIG. 5, the pixel PXL may include a pixel circuit PXC and a light emitting element LE. The photo sensor PHS may include a photo sensor circuit PSC and a light receiving element LRE.

The scan line SCLi may include a first scan line SCL1*i*, a second scan line SCL2*i*, a third scan line SCL3*i*, and a fourth scan line SCL4*i*.

The power line PL may include a first power line PL1, a second power line PL2, a third power line PL3, a fourth power line PL4, a fifth power line PL5, and a sixth power line PL6.

The pixel circuit PXC may be connected to the light emitting element LE. The pixel circuit PC may be configured to adjust a magnitude of a current flowing through the light emitting element LE. The pixel circuit PXC may include at least two transistors and at least one capacitor. The pixel circuit PXC may be variously implemented by designs of those skilled in the art. However, hereinafter, a structure (also, referred to as an 8T2C structure) in which the pixel circuit PXC includes eight transistors and two capacitors with reference to the equivalent circuit diagram shown in FIG. 5 will be described as an example.

Referring to FIG. 5, the pixel circuit PXC may include first to eighth pixel transistors TR1 to TR8 and first and second capacitors Cap1 and Cap2.

The pixel transistor TR1 may be configured to adjust a magnitude of a current flowing between a first node N1 and the second node N2 in response to a voltage of a fourth node N4. The fourth node N4 may be electrically connected to a gate electrode of the first pixel transistor TR1. The first node N1 may be electrically connected to one electrode (e.g., any one of a source electrode and a drain electrode) of the first pixel transistor TR1. The second node N2 may be electrically connected to the other electrode (e.g., the other of the source electrode and the drain electrode) of the first pixel transistor TR1. A magnitude of a current flowing through the first pixel transistor TR1 (or a magnitude of a current flowing through the light emitting element LE) may be controlled according to a magnitude of the voltage applied to the fourth node N4. The first pixel transistor TR1 may be designated as a driving transistor.

The second pixel transistor TR2 may be configured to switch an electrical connection between the first node N1 and the data line DLj. The second pixel transistor TR2 may include a gate electrode connected to the first scan line SCL1*i*. According to some embodiments, the first scan line SCL1*i* may serve as the gate electrode of the second pixel transistor TR2. The second pixel transistor TR2 may be configured to transfer, to the first node N1, a voltage (e.g., a data voltage) applied to the data line DLj, in response to a first scan signal GW[i]. The first scan signal GW[i] may be input to the first scan line SCL1*i*. The second pixel transistor TR2 may be designated as a switching transistor.

The third pixel transistor TR3 may be configured to switch an electrical connection between the second node N2 and the fourth node N4. The third pixel transistor TR3 may include a gate electrode connected to the third scan line SCL3*i*. The third pixel transistor TR3 may switch the electrical connection between the second node N2 and the fourth node N4 in response to a third scan signal GC [i]. The third scan signal GC [i] may be applied to the third scan line SCL3*i*. When the third pixel transistor TR3 is turned on, the first pixel transistor TR1 may operate as a diode form. The third pixel transistor TR3 may be designated as a compensation transistor.

The fourth pixel transistor TR4 may be configured to switch an electrical connection between the fourth node and the third power line PL3. The fourth pixel transistor TR4 may include a gate electrode connected to the second scan line SCL2*i*. The fourth pixel transistor TR4 may switch the electrical connection between the fourth node N4 and the third power line PL3 in response to a second scan signal GI[i]. The second scan signal GI[i] may be applied to the second scan line SCL2*i*. The third power voltage Vint may be applied to the third power line PL3. When the fourth pixel transistor TR4 is turned on, the voltage of the fourth node N4 may be initialized to the third power voltage Vint. The third power voltage Vint may be designated as a first initialization voltage. The fourth pixel transistor TR4 may be designated as a first initialization transistor.

The fifth pixel transistor TR5 may be configured to switch an electrical connection between the first node N1 and the first power line PL1. The fifth pixel transistor TR5 may include a gate electrode connected to the emission control line EMLi. According to some embodiments, the emission control line EMLi may serve as the gate electrode of the fifth pixel transistor TR5. The fifth pixel transistor TR5 may switch the electrical connection between the first node N1 and the first power line PL1 in response to an emission control signal EM [i]. When the fifth pixel transistor TR5 is turned on, the first power voltage ELVDD may be applied to the first node N1. The fifth pixel transistor TR5 may be designated as a first emission control transistor.

The sixth pixel transistor TR6 may be configured to switch an electrical connection between the second node N2 and a fifth node N5. The sixth pixel transistor TR6 may include a gate electrode connected to the emission control line EMLi. According to some embodiments, the emission control line EMLi may serve as the gate electrode of the sixth pixel transistor TR6. The sixth pixel transistor TR6 may switch the electrical connection between the second node N2 and the fifth node N5 in response to the emission control signal EM [i]. Referring to FIG. 5, the fifth pixel transistor TR5 and the sixth pixel transistor TR6 may be electrically connected to the same emission control line EMLi. However, embodiments of the present disclosure are not limited thereto. The sixth pixel transistor TR6 may be designated as a second emission control transistor.

The seventh pixel transistor TR7 may be configured to switch an electrical connection between the fifth node N5 and the fourth power line PL4. The seventh pixel transistor TR7 may include a gate electrode connected to the fourth scan line SCL4*i*. According to some embodiments, the fourth scan line SCL4*i* may serve as the gate electrode of the seventh pixel transistor TR7. The seventh pixel transistor TR7 may switch the electrical connection between the fifth node N5 and the fourth power line PL4 in response to a fourth scan signal GB [i]. The fourth power voltage Vaint may be applied to the fourth power line PL4. When the seventh pixel transistor TR7 is turned on, a voltage of the fifth node N5 may be initialized to the fourth power voltage Vaint. The fourth power voltage Vaint may be designated as a second initialization voltage. The seventh transistor TR7 may be designated as a second initialization transistor.

The eighth pixel transistor TR8 may be configured to switch an electrical connection between the first node N1 and the fifth power line PL5. The eighth pixel transistor TR8 may include a gate electrode connected to the fourth scan line SCL4*i*. According to some embodiments, the fourth scan line SCL4*i* may serve as the gate electrode of the eighth pixel transistor TR8. The eighth pixel transistor TR8 may switch the electrical connection between the first node N1 and the fifth power line PL5 in response to the fourth scan signal GB [i]. The fifth power voltage Vobs may be applied to the fifth power line PL5. When the eighth pixel transistor TR8 is turned on, the fifth power voltage Vobs may be applied to the first node N1. When the fifth power voltage Vobs is applied to the first pixel transistor TR1, a change in characteristic value of the first pixel transistor TR1 may be reduced. The fifth power voltage Vobs may be designated as an on-bias voltage. The eighth pixel transistor TR8 may be designated as an on-bias transistor.

The first capacitor Cap1 may include one electrode CE11 connected to the fourth node N4 and the other electrode CE12 connected to the first power line PL1. The first capacitor Cap1 may be configured to maintain the voltage of the fourth node N4. When the fourth pixel transistor TR4 is turned on, the third power voltage Vint may be applied to the one electrode CE11 of the first capacitor Cap1 such that the first capacitor Cap1 is initialized.

The second capacitor Cap2 may include one electrode CE21 connected to the fourth node N4 and the other electrode CE22 connected to the third node N3. When the fourth pixel transistor TR4 is turned on, the third power voltage Vint may be applied to the one electrode CE21 of the second capacitor Cap2 such that the second capacitor Cap2 is initialized.

Each of the first to eighth pixel transistors TR1 to TR8 may be configured as an n-type transistor or a p-type transistor.

A turn-on level voltage of the n-type transistor may be a voltage having a high logic level, and a turn-off level voltage of the n-type transistor may be a voltage having a low logic level. A turn-on level voltage of the p-type transistor may be a voltage having a low logic level, and a turn-off level voltage of the p-type transistor may be a voltage having a high logic level.

According to some embodiments, the third pixel transistor TR3 and the fourth pixel transistor TR4 among the first to eighth pixel transistors TR1 to TR8 may be implemented with an n-type transistor, and the others may be implemented with a p-type transistor. However, embodiments according to the present disclosure are not limited thereto.

At least one of the first to eighth pixel transistors TR1 to TR8 may include an oxide semiconductor (or oxide semiconductor layer). At least one of the first to eighth pixel transistors TR1 to TR8 may include a silicon semiconductor (e.g., an amorphous silicon (a-Si) semiconductor a low temperature poly-silicon (LTPS) semiconductor). For example, the third pixel transistor TR3 and the fourth pixel transistor TR4 may include an oxide semiconductor. The first, second, and fifth to eighth pixel transistors TR1, TR2, and TR5 to TR8) may include a silicon semiconductor. However, embodiments of the present disclosure are not limited thereto.

The light emitting element LE may be connected between the fifth node N5 and the second power line PL5. The fifth node N5 may be electrically connected to an anode electrode of the light emitting element LE. The second power line PL2 may be electrically connected to a cathode electrode of the light emitting element LE. The second power voltage ELVSS may be applied to the second power line PL2.

The light emitting element LE may include a light emitting layer. According to a kind of the light emitting layer, the light emitting element LE may be implemented as an organic light emitting element including an organic light emitting layer, an inorganic light emitting element including an inorganic light emitting layer, a quantum dot light emitting element including a quantum dot (e.g., a nano rod), or the like.

One pixel circuit PXC may be connected to two or more light emitting elements LE. The two or more light emitting elements LE may be connected in series and/or parallel to each other.

The photo sensor circuit PSC may include first to third sensor transistors M1, M2, and M3.

The first sensor transistor M1 may be configured to switch an electrical connection between the fourth power line PL4 and the second sensor transistor M2. The first sensor transistor M1 may include a gate electrode connected to a sixth node N6. The first sensor transistor M1 may switch the electrical connection between the fourth power line PL4 and the second sensor transistor M2 according to a voltage level of the sixth node N6. The fourth power voltage Vaint may be applied to the fourth power line PL4.

The second sensor transistor M2 may be configured to switch an electrical connection between the first sensor transistor M1 and the sensing line RXk. The second sensor transistor M2 may include a gate electrode connected to the first scan line SCL1*i*. According to some embodiments, the first scan line SCL1*i* may serve as the gate electrode of the second sensor transistor M2. The second sensor transistor M2 may electrically connect between the first sensor transistor M1 and the sensing line RXk in response to a scan signal (e.g., the first scan signal GW[i]).

The third sensor transistor M3 may be configured to switch an electrical connection between the sixth power line PL6 and the sixth node N6. The third sensor transistor M3 may include a gate electrode electrically connected to the reset control line RSTL. According to some embodiments, the reset control line RSTL may serve as the gate electrode of the third sensor transistor M3. When the third sensor transistor M3 is turned on, a voltage of the sixth node N6 may be initialized to the sixth power voltage Vrst. Accordingly, the sixth power voltage Vrst may be applied to the light receiving element LRE. The sixth power voltage Vrst may be a turn-off level voltage (e.g., a high logic level voltage) of the first sensor transistor M1. The sixth power voltage Vrst may be designated as a reset voltage.

The first to third sensor transistors M1 to M3 may be implemented with a p-type transistor or an n-type transistor. Each of the first to third sensor transistors M1 to M3 may include any one of an amorphous silicon (a-Si) semiconductor, a low temperature poly-silicon (LTPS) semiconductor, and an oxide semiconductor.

According to some embodiments, the third sensor transistor M3 may be implemented with an n-type transistor, and the first and second sensor transistors M1 and M2 may be implemented with a p-type transistor. However, embodiments according to the present disclosure are not limited thereto.

The light receiving element LRE may include one electrode connected to the sixth node N6 and the other electrode connected to the second power line PL2. A light receiving layer may be provided between the one electrode and the other electrode of the light receiving element LRE. When light is irradiated onto the light receiving element LRE, a current may flow in a direction toward the second power line PL2 from the sixth node N6. The light receiving element LRE may be implemented, for example, as a photo diode.

According to some embodiments of the present disclosure, a process in which a current flows in the sensing line RXk will be briefly described as follows.

According to some embodiments of the present disclosure, when light is irradiated onto the light receiving element LRE, a current may flow through the light receiving element LRE. When the current flows through the light receiving element LRE, the voltage of the sixth node N6 may gradually decrease. When the voltage of the sixth node N6 becomes lower than a threshold voltage of the first sensor transistor M1 as the voltage of the sixth node N6 gradually decreases, the first sensor transistor M1 may be turned on. When the first scan signal GW[i] having a turn-on level is input to the second sensor transistor M2, the second sensor transistor M2 may be turned on. Accordingly, when the first and second sensor transistors M1 and M2 are turned on, a current path connected from the fourth power line PL4 to the sensing line RXk may be formed. When a current flowing in the sensing line RXk is integrated (or when a voltage is sensed), an amount of light incident onto the light receiving element LRE may be calculated.

According to some embodiments of the present disclosure, an amount of reflected light reflected from an object adjacent to the photo sensor PHS may be measured using the photo sensor PHS.

According to some embodiments, the electronic device 100 (see FIG. 1) may sense the photo sensor PHS, thereby acquiring (or generating) a pattern (e.g., a pattern of a fingerprint) of an object adjacent to the photo sensor PHS. Accordingly, the electronic device 100 according to some embodiments of the present disclosure may provide a biometric authentication (e.g., fingerprint authentication or the like) function.

According to some embodiments, the electronic device 100 (see FIG. 1) may sense the photo sensor PHS, thereby sensing a luminous intensity at the periphery of the electronic device 100, and providing a function of adaptively adjusting a luminance of the electronic device 100 according to the sensed luminous intensity.

Figure 6:
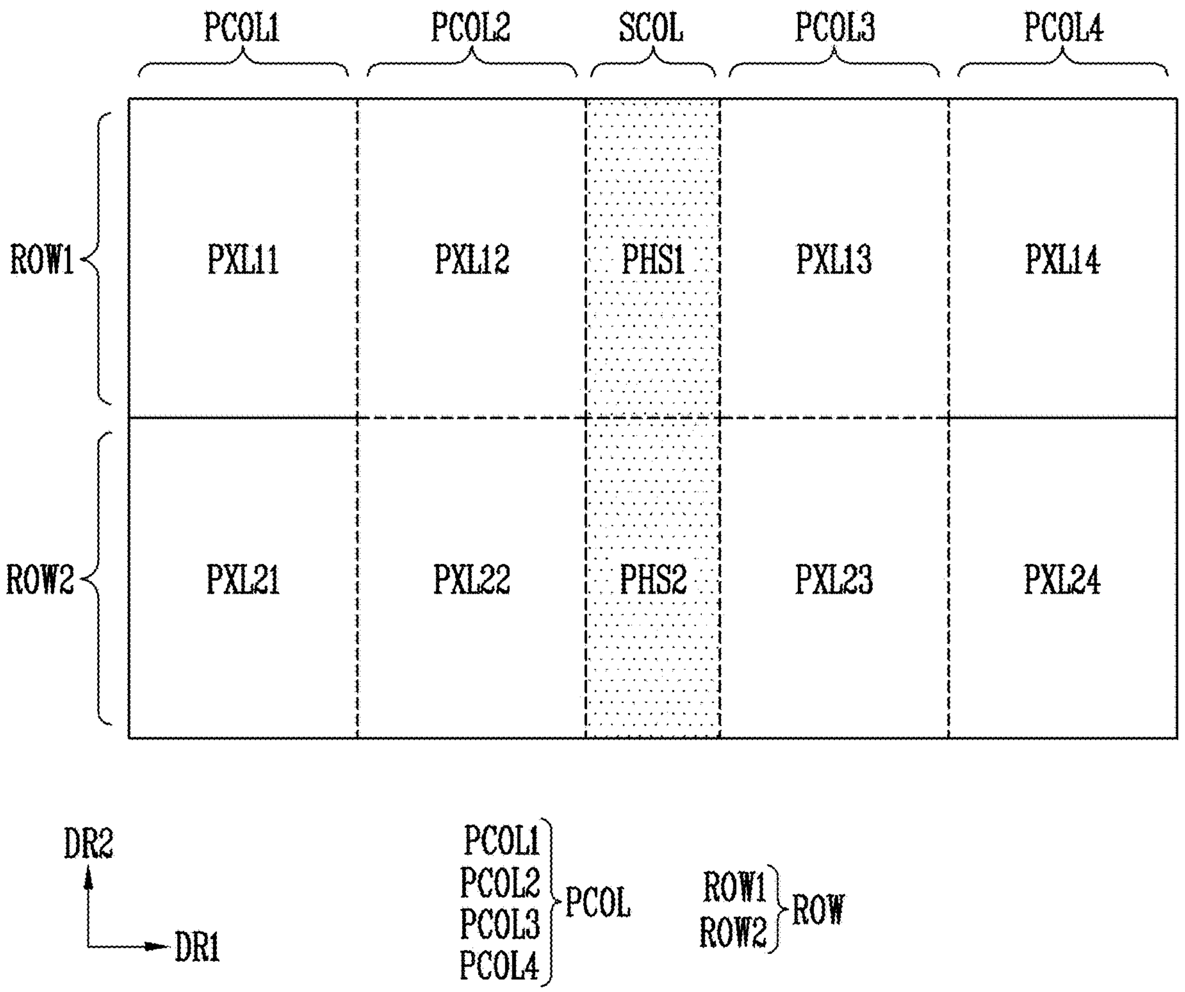
FIG. 6 is a diagram schematically illustrating a state in which pixels and photo sensors are located according to some embodiments of the present disclosure.

FIG. 6 is a diagram schematically illustrating a state in which pixels and photo sensors are arranged according to some embodiments of the present disclosure.

Referring to FIG. 6, eight pixels PXL11, PXL12, PXL13, PXL14, PXL21, PXL22, PXL23, and PXL24 and two photo sensors PHS1 and PHS2 are representatively illustrated.

A first pixel PXL11, a second pixel PXL12, a third pixel PXL13, a fourth pixel PXL14, and a first photo sensor PHS1 may be located on the first pixel row ROW1. A fifth pixel PXL21, a sixth pixel PXL22, a seventh pixel PXL23, an eighth pixel PXL24, and a second photo sensor PHS2 may be located on a second pixel low ROW2.

The first to fourth pixels PXL11 to PXL14 and the first photo sensor PHS1, which are located on the first pixel row ROW1, may be located adjacent to each other in the first direction DR1. The fifth to eighth pixels PXL21 to PXL24 and the second photo sensor PHS2, which are located on the second pixel row ROW2, may be located adjacent to each other in the first direction DR1.

The first pixel row ROW1 and the second pixel row ROW2 may be located adjacent to each other in the second direction DR2.

According to some embodiments, the first pixel PXL11 and the fifth pixel PXL21 may be located adjacent to each other in the second direction DR2. The first pixel PXL11 and the fifth pixel PXL21 may be located on a first pixel column PCOL1. Similarly, the second pixel PXL12 and the sixth pixel PXL22 may be located on a second pixel column PCOL2. The third pixel PXL13 and the seventh pixel PXL23 may be located on a third pixel column PCOL3. The fourth pixel PXL14 and the eighth pixel PXL24 may be located on a fourth pixel column PCOL4.

The first sensor PHS1 and the second sensor PHS2 may be located on a sensor column SCOL.

According to some embodiments, it is illustrated that the sensor column SCOL is located between the second pixel column PCOL2 and the third pixel column PCOL3. However, embodiments of the present disclosure are not limited thereto.

According to some embodiments, the sensor column SCOL is not located between the first pixel column PCOL1 and the second pixel column PCOL2 and between the third pixel column PCOL3 and the fourth pixel column PCOL4, but may be located only between the second pixel column PCOL2 and the third pixel column PCOL3. However, embodiments of the present disclosure are not limited thereto. For example, the sensor column SCOL may be located between the respective pixel columns PCOL.

Meanwhile, as the size of each of the pixel and the photo sensor be miniaturized, the arrangement of the above-described power line or the like may gradually become difficult.

According to some embodiments of the present disclosure, only one sixth power line PL6 (see FIG. 5) may be located between the first pixel row ROW1 and the second pixel row ROW2, and the first photo sensor PHS1 and the second photo sensor PHS2 may share the one sixth power line PL6. Accordingly, the size of each of the pixel and the photo sensor may become smaller. This will be described in more detail with reference to layout views of drawings from FIG. 7.

Figure 7:
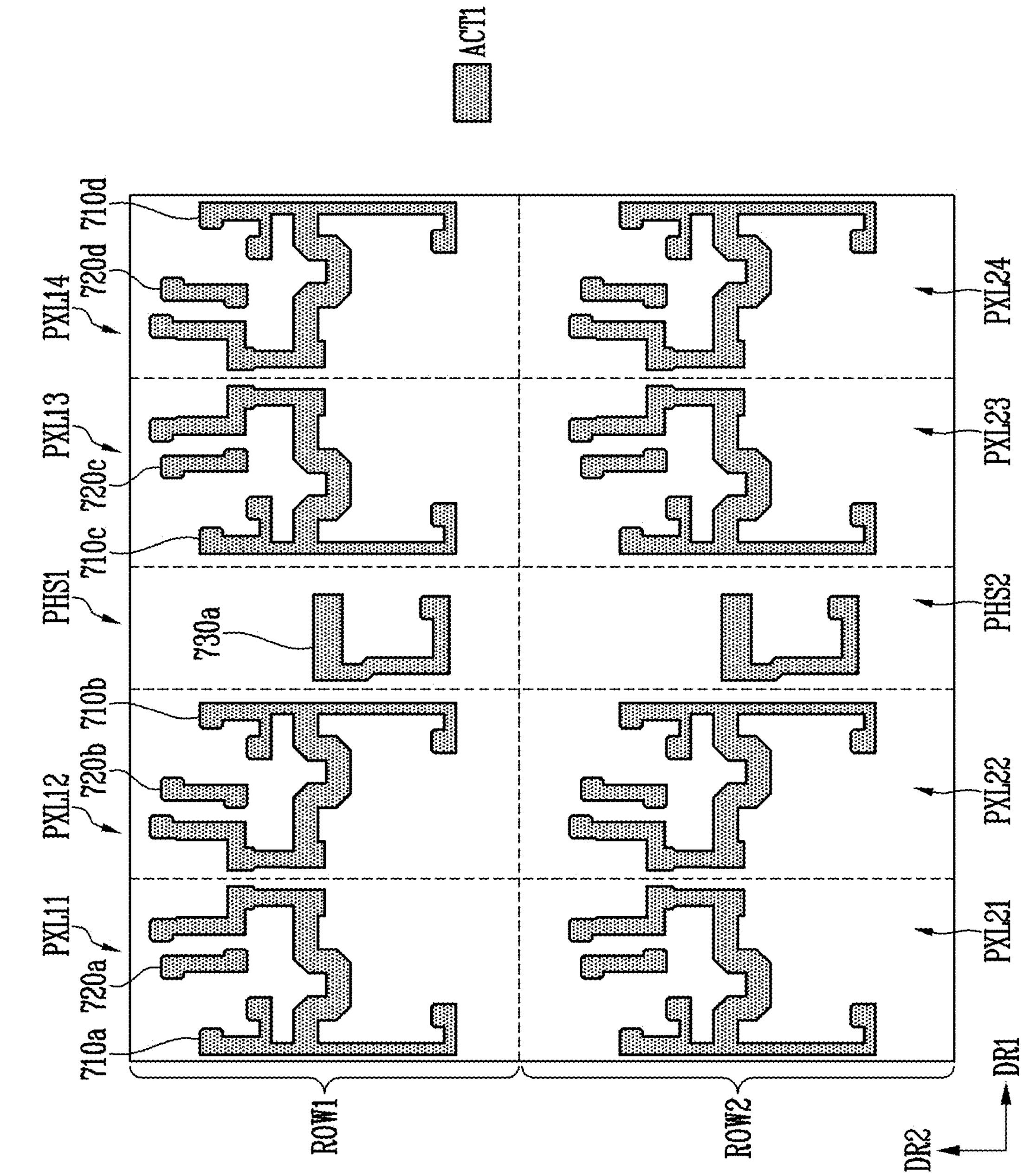
FIG. 7 is a layout view of a first semiconductor layer.

FIG. 7 is a layout view of a first semiconductor layer ACT1.

Referring to FIG. 7, the first semiconductor layer ACT1 may include a plurality of patterns. The first semiconductor layer ACT1 may be located on the substrate SUB (see FIG. 3).

The substrate may be made of an insulative material such as glass or resin. Also, the substrate SUB may be made of a material having flexibility to be bendable or foldable, and have a single-layer structure or a multi-layer structure. The substrate may include at least one base layer and at least one barrier layer, which are sequentially stacked. The base layer may include polyimide (PI), polyethersulfone (PES), polyarylate, polyetherimide (PEI), polyethylene naphthalate (PEN), polyethylene terephthalate (PET), polyethylene sulfide (PPS), polycarbonate (PC), cellulose triacetate (CTA), and/or cellulose acetate propionate (CAP). The barrier layer may include an inorganic insulating material such as silicon oxide, silicon oxynitride, and/or silicon nitride.

According to some embodiments, a buffer layer may be further located between the substrate and the first semiconductor layer ACT1. The buffer layer may prevent or reduce instances of an impurity being diffused into a circuit element (e.g., a transistor). The buffer layer may be omitted according to a material of the base layer and a process condition. The buffer layer may include an inorganic insulating material such as silicon oxide, silicon oxynitride, and/or silicon nitride. The buffer layer may be provided in a single-layer structure or a multi-layer structure, which includes the above-described material.

Each of the first to eighth pixels PXL11 to PXL24 may include a first pattern and a second pattern.

Hereinafter, the first to fourth pixels PXL11 to PXL14 located on the first pixel row ROW1 will be mainly described. However, this may be equally applied to the fifth to eighth pixels PXL21 to PXL24 located on the second pixel row ROW2.

The first pixel PXL11 may include a first pattern 710*a* and a second pattern 720*a*. The second pixel PXL12 may include a first pattern 710*b* and a second pattern 720*b*. The third pixel PXL13 may include a first pattern 710*c* and a second pattern 720*c*. The fourth pixel PXL14 may include a first pattern 710*d* and a second pattern 720*d*.

Each of the first and second photo sensors PHS1 and PHS2 may include a third pattern. For example, the first photo sensor PHS1 may include a third pattern 730*a*.

According to some embodiments, the first semiconductor layer ACT1 may be formed of a poly-silicon semiconductor. For example, the first semiconductor layer ACT1 may be formed through a low temperature polycrystalline silicon (LTPS) process.

A first gate insulating layer may be provided over the first semiconductor layer ACT1. The first gate insulating layer may be an inorganic insulating layer including an inorganic material. The first gate insulating layer may include an inorganic insulating material such as silicon oxide ($SiO_2$), silicon nitride ($SiN_x$) (x is a positive number), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_2$).

Figure 8:
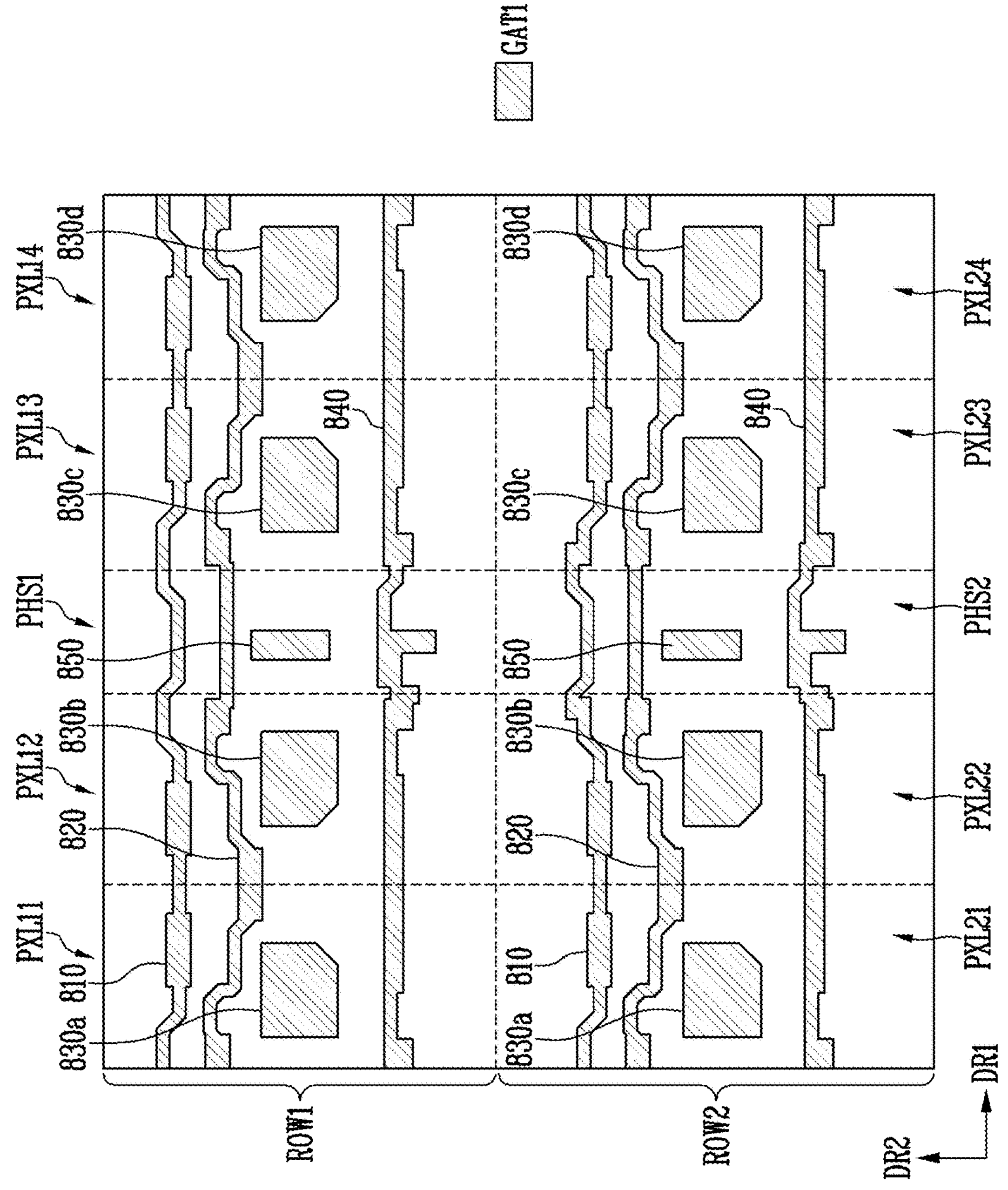
FIG. 8 is a layout view of a first gate electrode layer.

FIG. 8 is a layout view of a first gate electrode layer GAT1.

Referring to FIG. 8, the first gate electrode layer GAT1 may include a plurality of patterns. The first gate electrode layer GAT1 may include patterns entirely extending in the first direction DR1 and patterns formed in an island shape.

For example, this will be described based on the first pixel row ROW1.

The first gate electrode layer GAT1 may include a first pattern 810, a second pattern 820, and a fourth pattern 840, which extend in the first direction DR1. The first pattern 810 and the second pattern 820 may be located adjacent to each other in the second direction DR2. Third patterns 830*a*, 830*b*, 830*c*, and 830*d* having an island shape and a fifth pattern 850 may be located between the second pattern 820 and the fourth pattern 840.

Each of the first to fourth pixels PXL11 to PXL14 located on the first pixel row ROW1 may include corresponding one of the third patterns 830*a*, 830*b*, 830*c*, and 830*d*.

The first photo sensor PHS1 may include the fifth pattern 850.

The first gate electrode layer GAT1 may include a metal. For example, the first gate electrode layer GAT1 may be made of at least one of metals such as gold (Au), silver (Ag), aluminum (Al), molybdenum (Mo), chromium (Cr), titanium (Ti), nickel (Ni), neodymium (Nd), or copper (Cu), or alloys thereof. Also, the first gate electrode layer GAT1 may be formed as a single layer, or be formed as a multi-layer in which two or more materials among the metals and the alloys are stacked.

The first gate electrode layer GAT1 may be located on the first gate insulating layer. A first interlayer insulating layer may be provided over the first gate electrode layer GAT1. The first interlayer insulating layer may include an inorganic insulating layer including an inorganic material. Polysiloxane, silicon nitride, silicon oxide, silicon oxynitride, and the like may be used as the inorganic material.

Figure 9:
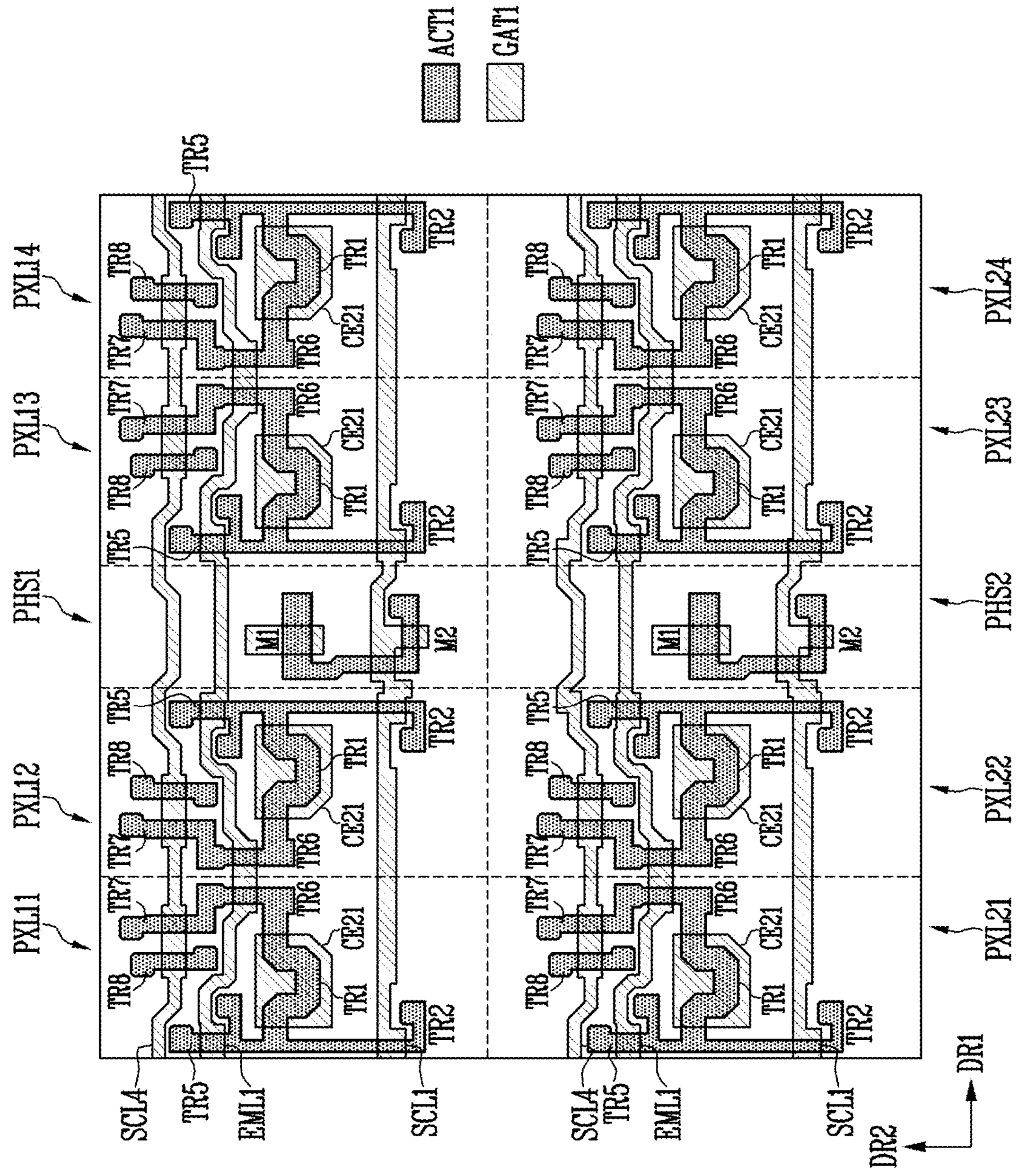
FIG. 9 is a stacked layout view of the first semiconductor layer and the first gate electrode layer.

FIG. 9 is a stacked layout view of the first semiconductor layer ACT1 and the first gate electrode layer GAT1.

Referring to FIG. 9, the first gate electrode layer GAT1 may overlap with at least a portion of the first semiconductor layer ACT1. A channel region may be formed in a region in which the first semiconductor layer ACT1 overlaps with the first gate electrode layer GAT1.

The first semiconductor layer ACT1 may constitute semiconductor layers of first, second, and fifth to eighth pixel transistors TR1, TR2 and TR5 to TR8 of each of the first to eighth pixels PXL11 to PXL24. The first semiconductor layer ACT1 may constitute semiconductor layers of first and second sensor transistors M1 and M2 of each of the first and second photo sensors PHS1 and PHS2.

The first gate electrode layer GAT1 may constitute gate electrodes of the first, second, and fifth to eighth pixel transistors TR1, TR2 and TR5 to TR8 of each of the first to eighth pixels PXL11 to PXL24. The first gate electrode layer GAT1 may constitute a fourth scan line SCL4, a first emission control line EML1, and a first scan line SCL1. The first gate electrode layer GAT1 may constitute one electrode CE21 of a second capacitor.

Figure 10:
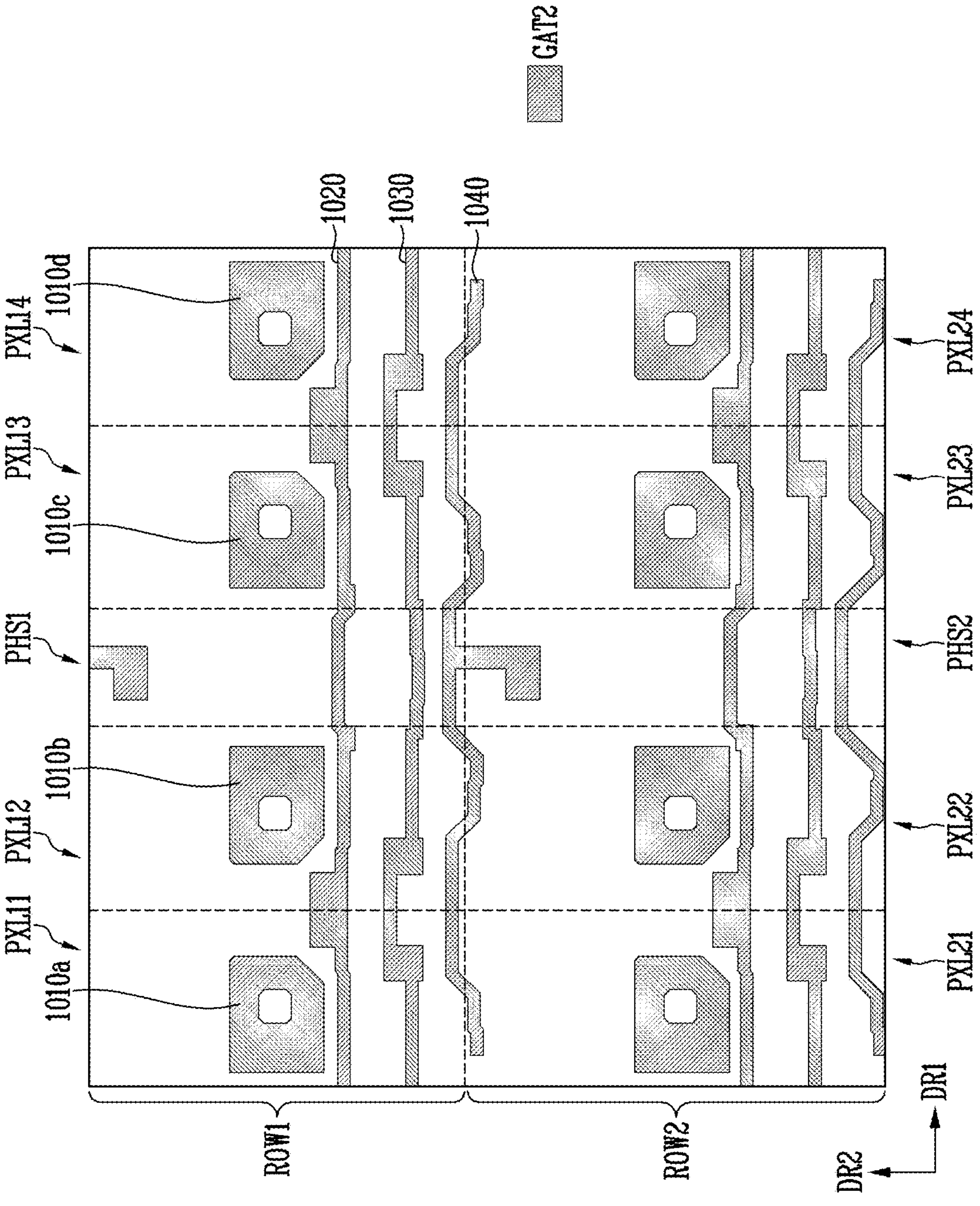
FIG. 10 is a layout view of a second gate electrode layer.

FIG. 10 is a layout view of a second gate electrode layer GAT2.

The second gate electrode layer GAT2 may include a plurality of patterns. For example, the second gate electrode layer GAT2 may include a second pattern 1020, a third pattern 1030, and a fourth pattern 1040, which entirely extend in the first direction DR1. The second gate electrode GAT2 may include a plurality of first patterns 1010*a*, 1010*b*, 1010*c*, and 1010*d* having an island shape.

This will be described based on the first pixel row ROW1.

Each of the first to fourth pixels PXL11 to PXL14 may include corresponding one of the plurality of first patterns 1010*a*, 1010*b*, 1010*c*, and 1010*d*. Each of the plurality of first patterns 1010*a*, 1010*b*, 1010*c*, and 1010*d* may have an opening provided at a center thereof. This may be equally applied to the fifth to eighth pixels PXL21 to PXL24 located on the second pixel row ROW2.

The second gate electrode layer GAT2 may include a metal. For example, the second gate electrode layer GAT2 may be made of at least one of metals such as gold (Au), silver (Ag), aluminum (Al), molybdenum (Mo), chromium (Cr), titanium (Ti), nickel (Ni), neodymium (Nd), or copper (Cu), or alloys thereof. Also, the second gate electrode layer GAT2 may be formed as a single layer, or be formed as a multi-layer in which two or more materials among the metals and the alloys are stacked.

The second gate electrode layer GAT2 may be located on the first interlayer insulating layer. A second interlayer insulating layer may be provided over the second gate electrode layer GAT2. The second interlayer insulating layer may include an inorganic insulating layer including an inorganic material. At least one of polysiloxane, silicon nitride, silicon oxide, or silicon oxynitride may be selected as the inorganic material.

Figure 11:
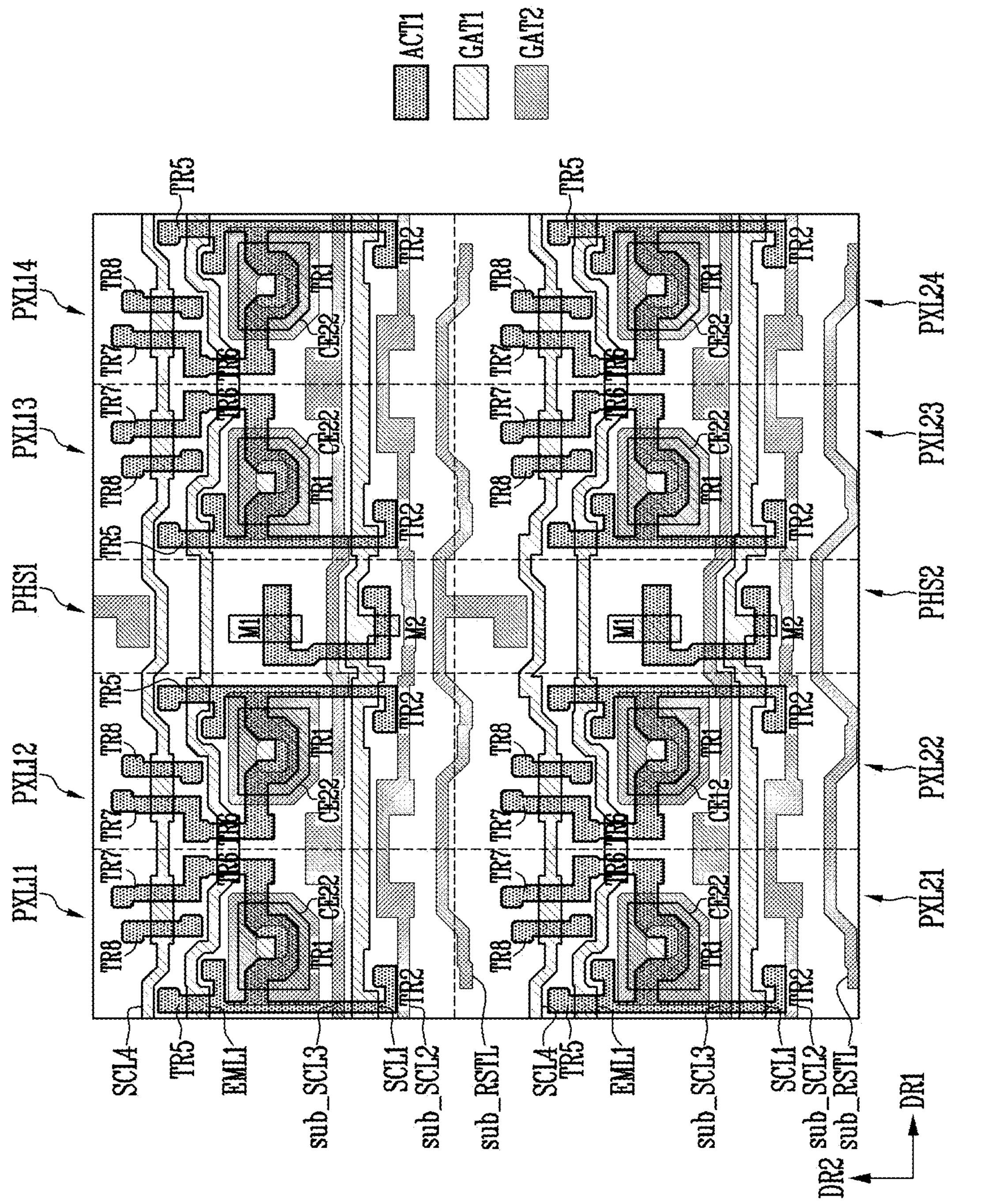
FIG. 11 is a stacked layout view of the first semiconductor layer, the first gate electrode layer, and the second gate electrode layer.

FIG. 11 is a stacked layout view of the first semiconductor layer ACT1, the first gate electrode layer GAT1, and the second gate electrode layer GAT2.

Referring to FIG. 11, the second gate electrode layer GAT2 may constitute a sub-electrode sub_SCL3 of a third scan line, a sub-electrode sub_SCL2 of a second scan line, and a sub-electrode sub_RSTL of a reset control line.

A signal identical to a signal applied to a corresponding signal line or a signal corresponding thereto may be applied to each of the sub-electrodes of the signal lines. For example, a signal identical to a signal applied to a reset control line RSTL (see drawings from FIG. 16) which will be described later or a signal corresponding thereto may be written to the sub-electrode sub_RSTL of the reset control line.

The second gate electrode layer GAT2 may constitute the other electrode CE22 of the second capacitor. The other electrode CE22 of the second capacitor may be located in a region facing the one electrode CE21 (see FIG. 9) of the second capacitor.

Figure 12:
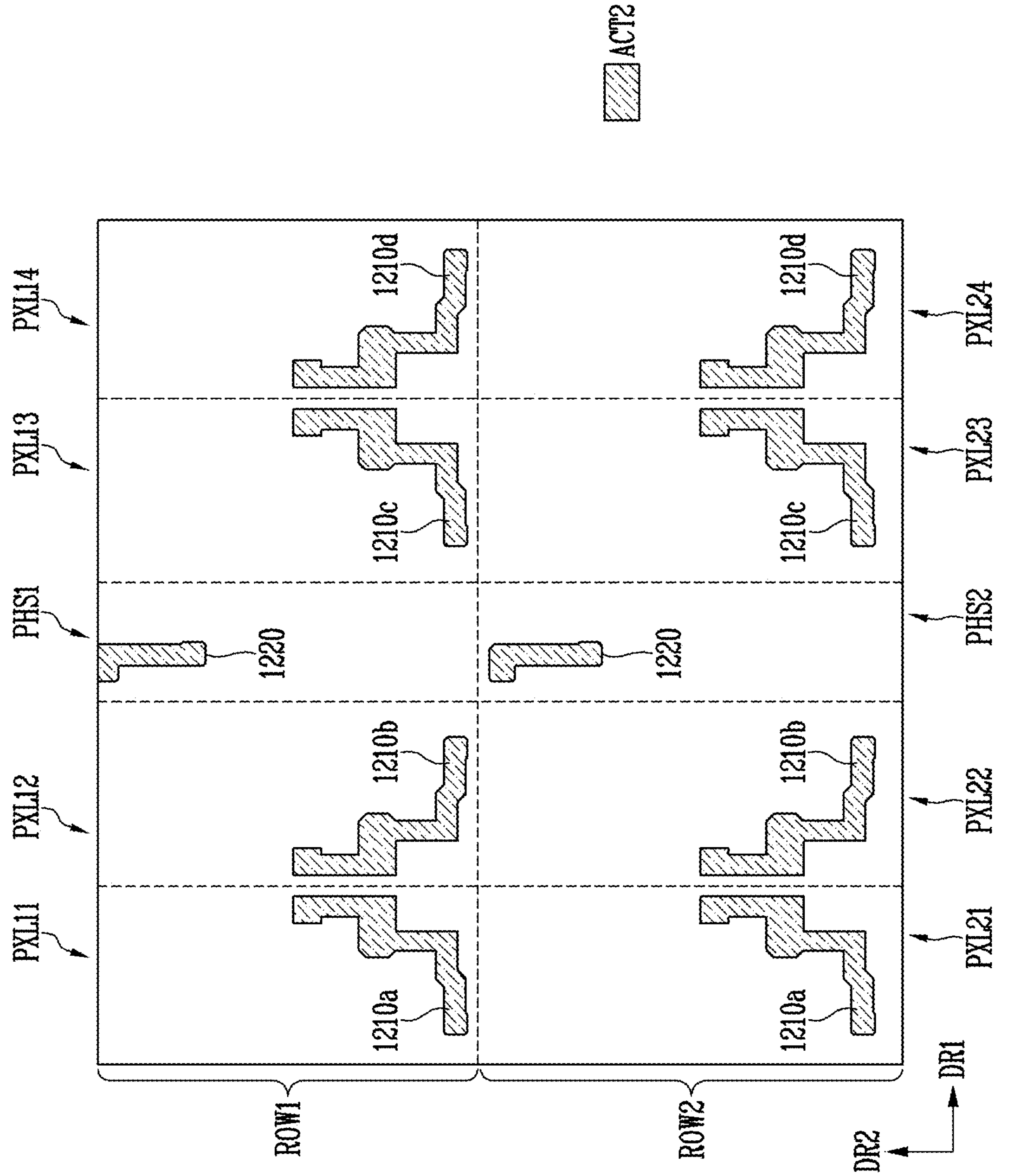
FIG. 12 is a layout view of a second semiconductor layer.

FIG. 12 is a layout view of a second semiconductor layer ACT2.

The second semiconductor layer ACT2 may include a plurality of patterns. For example, this will be mainly described based on the first pixel row ROW1.

Each of the first pixel PXL11, the second pixel PXL12, the third pixel PXL13, and the fourth pixel PXL14 may include corresponding one of a plurality of first patterns 1210*a*, 1210*b*, 1210*c*, and 1210*d*. The first photo sensor PHS1 may include a second pattern 1220. This may be equally applied to the fifth to eighth pixels PXL21 to PXL24 and the second photo sensor PHS2, which are located on the second pixel row ROW2.

According to some embodiments, the second semiconductor layer ACT2 may include an oxide semiconductor. For example, the second semiconductor layer ACT2 may be formed through a process of forming a metal oxide semiconductor. A second gate insulating layer may be provided over the second active pattern ACT2. The second gate insulating layer may be an inorganic insulating layer including an inorganic material. For example, at least one of polysiloxane, silicon nitride, silicon oxide, silicon oxynitride, and the like may be selected as the inorganic material.

Figure 13:
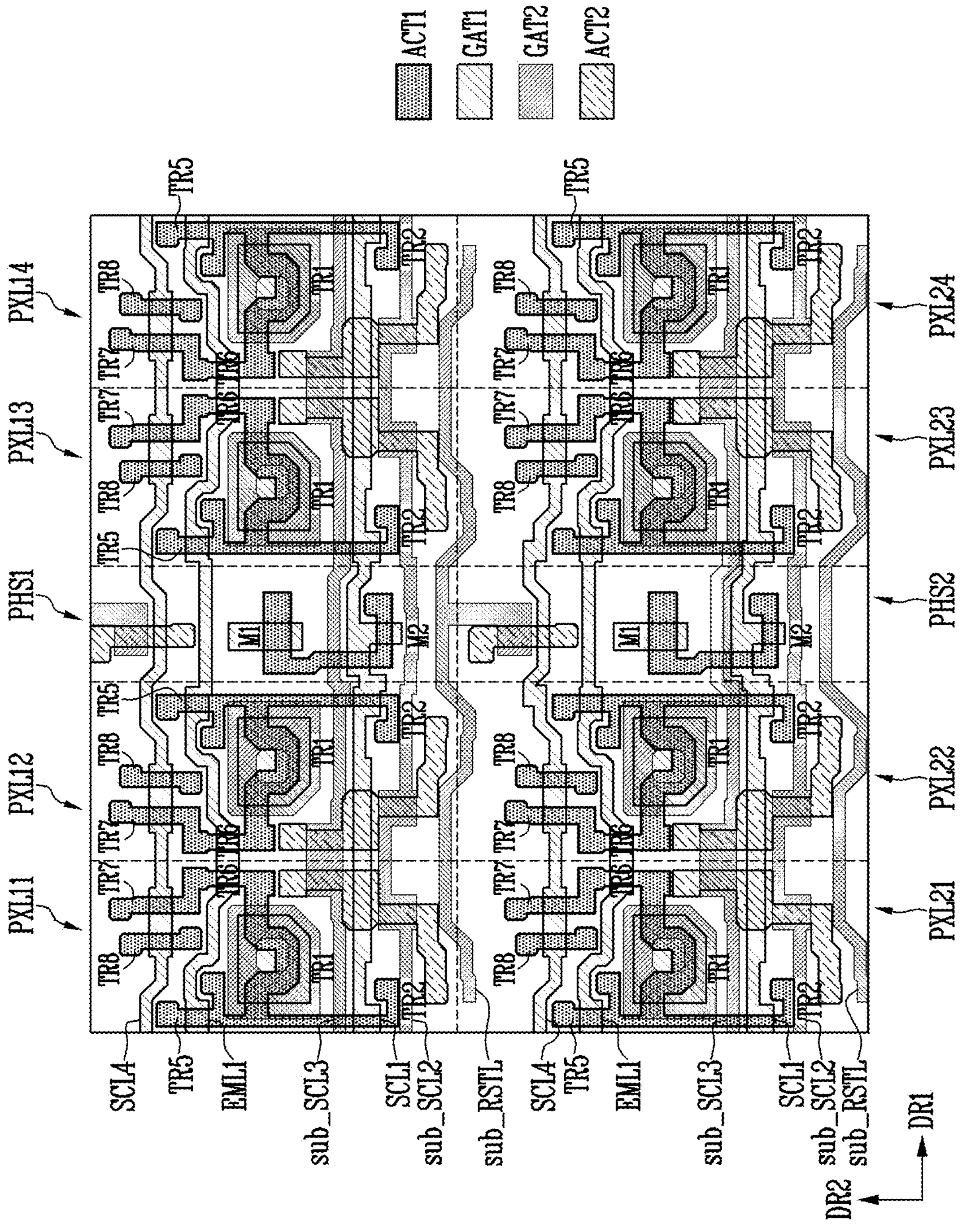
FIG. 13 is a stacked layout view of the first semiconductor layer, the first gate electrode layer, the second gate electrode layer, and the second semiconductor layer.

FIG. 13 is a stacked layout view of the first semiconductor layer ACT1, the first gate electrode layer GAT1, the second gate electrode layer GAT2, and the second semiconductor layer ACT2.

Referring to FIG. 13, the second semiconductor layer ACT2 may be located on the second gate electrode layer GAT2.

Figure 14:
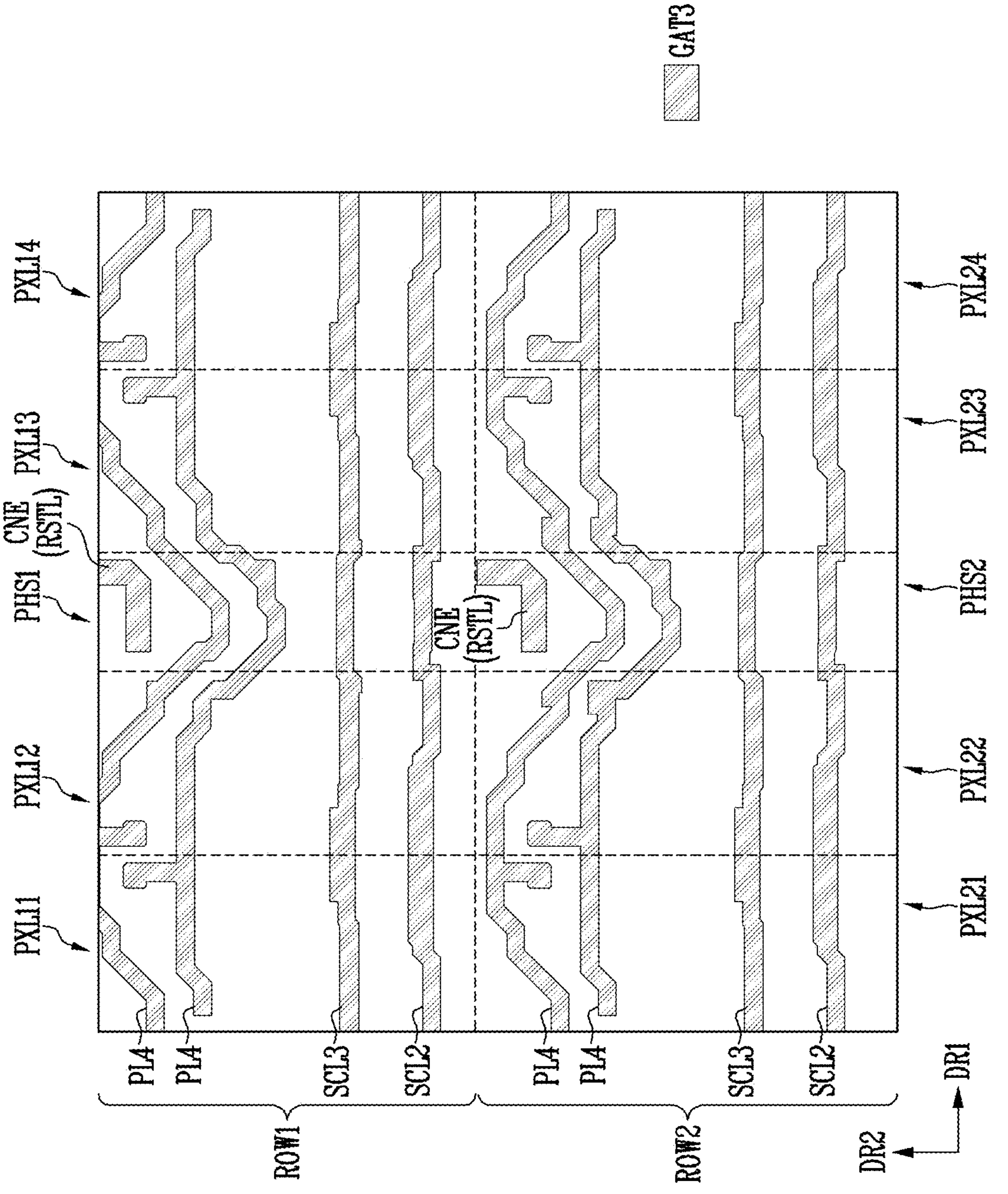
FIG. 14 is a layout view of a third gate electrode layer.

FIG. 14 is a layout view of a third gate electrode layer GAT3.

The third gate electrode layer GAT3 may include a plurality of patterns. Referring to FIG. 14, the third gate electrode layer GAT3 may constitute the fourth power line PL4, the third scan line SCL3, and the second scan line SCL2, which entirely extend in the first direction DR1. The third gate electrode layer GAT3 may include a connection electrode CNE formed in an island shape.

According to some embodiments, the third gate electrode layer GAT3 may constitute the connection electrode CNE of the reset control line RSTL.

The third gate electrode layer GAT3 may include a metal. For example, the third gate electrode layer GAT3 may be made of at least one of metals such as gold (Au), silver (Ag), aluminum (Al), molybdenum (Mo), chromium (Cr), titanium (Ti), nickel (Ni), neodymium (Nd), or copper (Cu), or alloys thereof. Also, the third gate electrode layer GAT3 may be formed as a single layer, or be formed as a multi-layer in which two or more materials among the metals and the alloys are stacked.

The third gate electrode layer GAT3 may be located on the second gate insulating layer. A second interlayer insulating layer may be provided over the third gate electrode layer GAT3. The second interlayer insulating layer may include an inorganic insulating layer including an inorganic material. Polysiloxane, silicon nitride, silicon oxide, silicon oxynitride, and the like may be used as the inorganic material.

Figure 15:
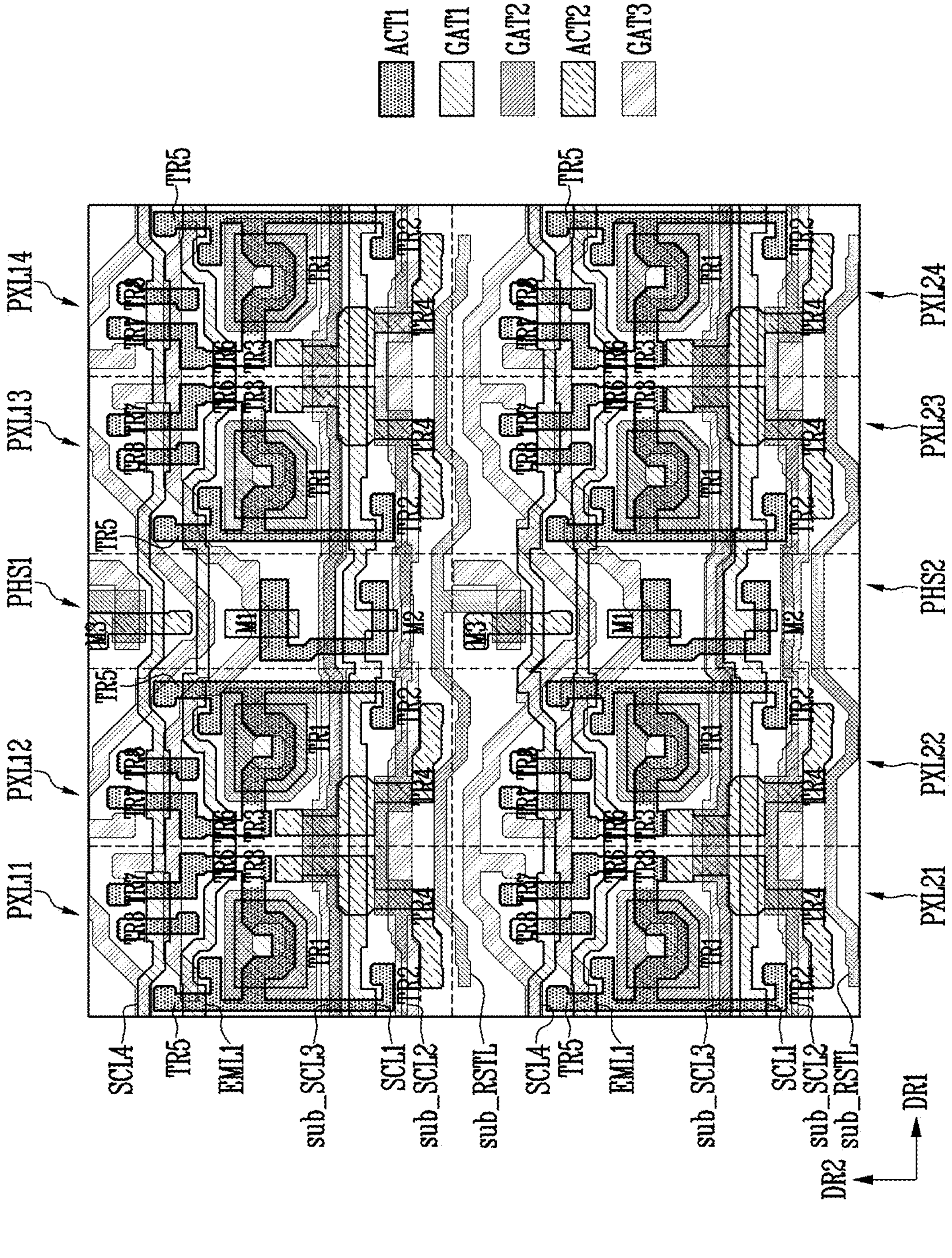
FIG. 15 is a stacked layout view of the first semiconductor layer, the first gate electrode layer, the second gate electrode layer, the second semiconductor layer, and the third gate electrode layer.

FIG. 15 is a stacked layout view of the first semiconductor layer ACT1, the first gate electrode layer GAT1, the second gate electrode layer GAT2, the second semiconductor layer ACT2, and the third gate electrode layer GAT3.

Referring to FIG. 15, the second semiconductor layer ACT2 may constitute semiconductor layers of third and fourth pixel transistors TR3 and TR4 of each of the first to eighth pixels PXL11 to PXL24. The second semiconductor layer ACT2 may constitute a semiconductor layer of a third sensor transistor M3 of each of the first and second photo sensors PHS1 and PHS2.

The third gate electrode layer GAT3 may constitute gate electrodes of the third and fourth pixel transistors TR3 and TR4 and a gate electrode of the third sensor transistor M3.

The third gate electrode layer GAT3 may constitute the third scan line SCL3. The third scan line SCL3 may be located while overlapping with the sub-electrode sub_SCL3 of the third scan line.

The third gate electrode layer GAT3 may constitute the second scan line SCL2. The second scan line SCL2 may be located while overlapping with the sub-electrode sub_SCL2 of the second scan line.

Figure 16:
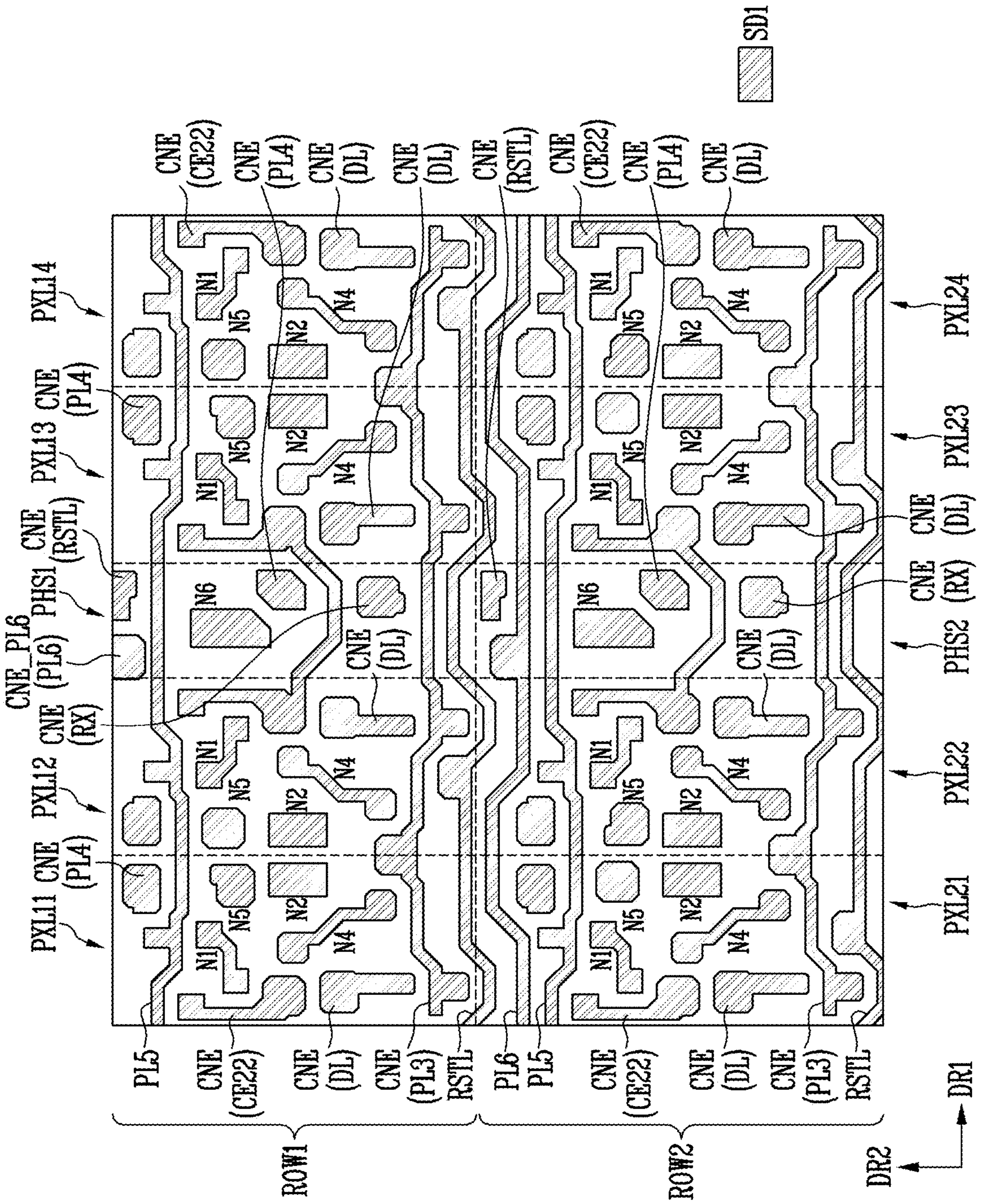
FIG. 16 is a layout view of a first source drain electrode.

FIG. 16 is a layout view of a first source drain electrode SD1.

The first source drain electrode SD1 may include a plurality of patterns. The first source drain electrode SD1 may constitute the fifth power line PL5, the sixth power line PL6, and the reset control line RSTL, which entirely extend in the first direction DR1.

The fifth power line PL5 and the reset control line RSTL may be located on the first pixel row ROW1 and the second pixel row ROW2, respectively.

The sixth power line PL6 may be located between the first pixel row ROW1 and the second pixel row ROW2. Alternatively, the sixth power line PL6 may be located on only any one of the first pixel row ROW1 and the second pixel row ROW2, and may not be located on the other of the first pixel row ROW1 and the second pixel row ROW2.

According to some embodiments, the sixth power line PL6 may be located on the second pixel row ROW2, and may not be located on the first pixel row ROW1. The sixth power line PL6 is not located on the first pixel row ROW1, but a sixth power line connection electrode CNE_PL6 may be located on the first pixel row ROW1.

The first source drain electrode SD1 may constitute a plurality of nodes. For example, the first source drain electrode SD1 may constitute first, second, fourth, and fifth nodes N1, N2, N4, and N5 of each of the first to eighth pixels PXL11 to PXL24. For example, the first source drain electrode SD1 may constitute a sixth node N6 of each of the first and second photo sensors PHS1 and PHS2.

The first source drain electrode SD1 may constitute the other electrode CE22 of the second capacitor.

The first source drain electrode SD1 may constitute a plurality of connection electrodes CNE. The first source drain electrode SD1 may constitute a connection electrode of the fourth power line PL4, a connection electrode of the reset control line RSTL, a connection electrode of a sensing line RX, a connection electrode of a data line DL, and the like.

Figure 17:
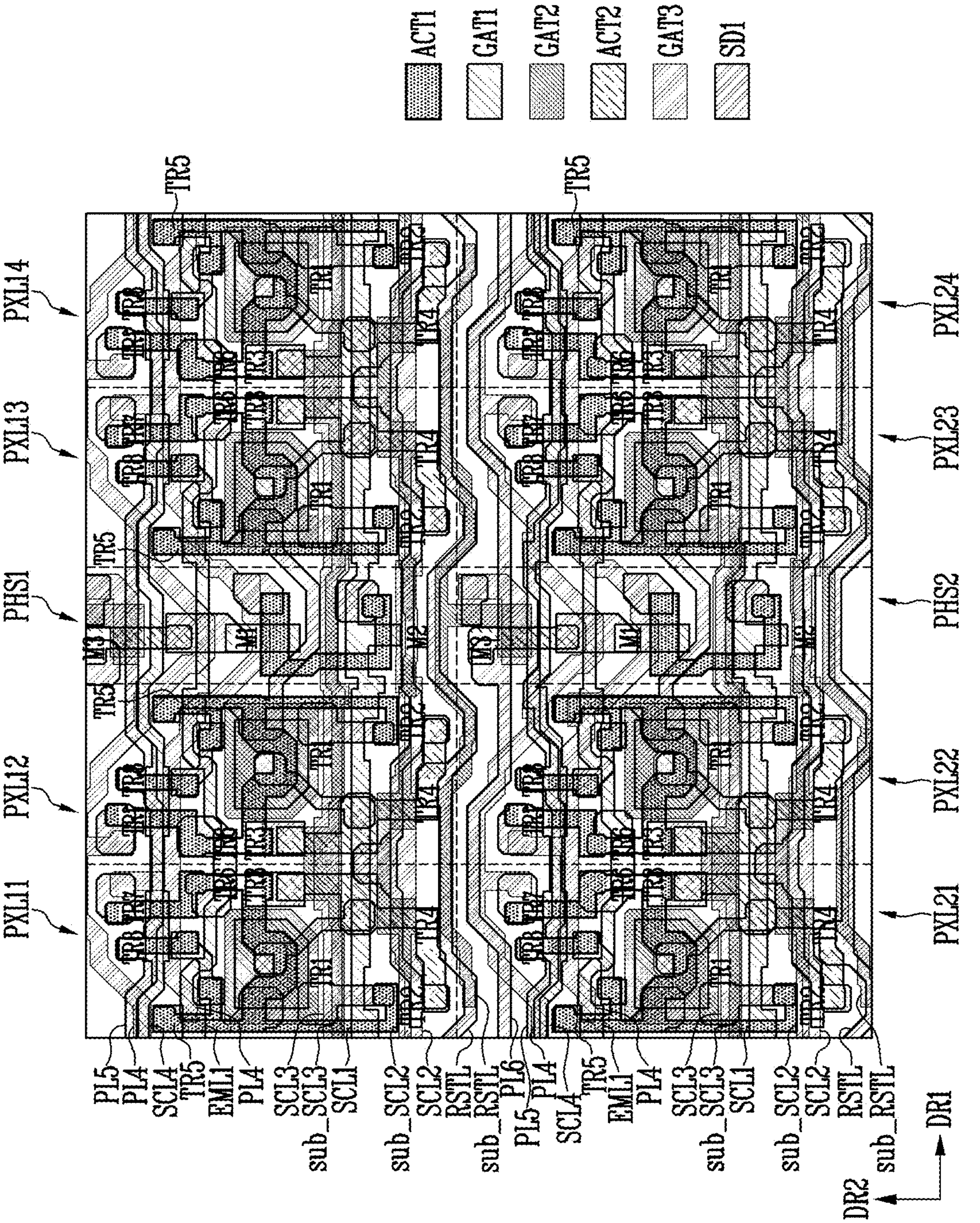
FIG. 17 is a stacked layout view of the first semiconductor layer, the first gate electrode layer, the second gate electrode layer, the second semiconductor layer, the third gate electrode layer, and the first source drain electrode.

FIG. 17 is a stacked layout view of the first semiconductor layer ACT1, the first gate electrode layer GAT1, the second gate electrode layer GAT2, the second semiconductor layer ACT2, the third gate electrode layer GAT3, and the first source drain electrode SD1.

The first source drain electrode SD1 may be connected to a corresponding pattern among the first semiconductor layer ACT1, the first gate electrode layer GAT1, the second gate electrode layer GAT2, the second semiconductor layer ACT2, and the third gate electrode layer GAT3, which are located thereunder.

Referring to FIG. 17, a semiconductor layer (or second semiconductor layer ACT2) of a third sensor transistor M3 of the second photo sensor PHS2 may be directly connected to the first source drain electrode SD1 constituting the sixth power line PL6. On the other hand, a semiconductor layer (or second semiconductor layer ACT2) of a third sensor transistor M3 of the first photo sensor PHS1 is not directly connected to the sixth power line PL6.

Accordingly, the sixth power line PL6 may not be located on any one of the first and second pixel rows ROW1 and ROW2. Thus, the display device having a high degree of integration of pixels can be provided.

The first source drain electrode SD1 may constitute source electrodes and drain electrodes of first to eighth pixel transistors TR1 to TR8 of each of the first to eighth pixels PXL11 to PXL24. For example, the first source drain electrode SD1 may be connected to the first semiconductor layer ACT1 or the second semiconductor layer ACT2 through a contact hole. Accordingly, the first source drain electrode SD1 may serve as a source electrode or a drain electrode of a transistor.

The first source drain electrode SD1 may include a metal. The first source drain electrode SD1 may include a material having excellent conductivity. According to some embodiments, the first source drain electrode SD1 may include a conductive material including molybdenum (Mo), aluminum (Al), copper (Cu), titanium (Ti), and the like. The first source drain electrode SD1 may be formed in a multi-layer structure or a single-layer structure, which includes the above-described material. According to some embodiments, the first source drain electrode SD1 may have a multi-layer structure of Ti/Al/Ti.

A first insulating layer may be provided over the first source drain electrode SD1. For example, the first insulating layer may be an organic insulating layer including an organic material. The first insulating layer may include an organic insulating material, such as a general purpose polymer such as polymethylmethacrylate or polystyrene, a polymer derivative having a phenolic group, an acryl-based polymer, an imide-based polymer, an aryl ether-based polyimide, an amide-based polymer, a fluorine-based polymer, a p-xylene-based polymer, a vinyl alcohol-based polymer, or any blend thereof. The first insulating layer may perform a function of planarizing an area on the first source drain electrode SD1.

Figure 18:
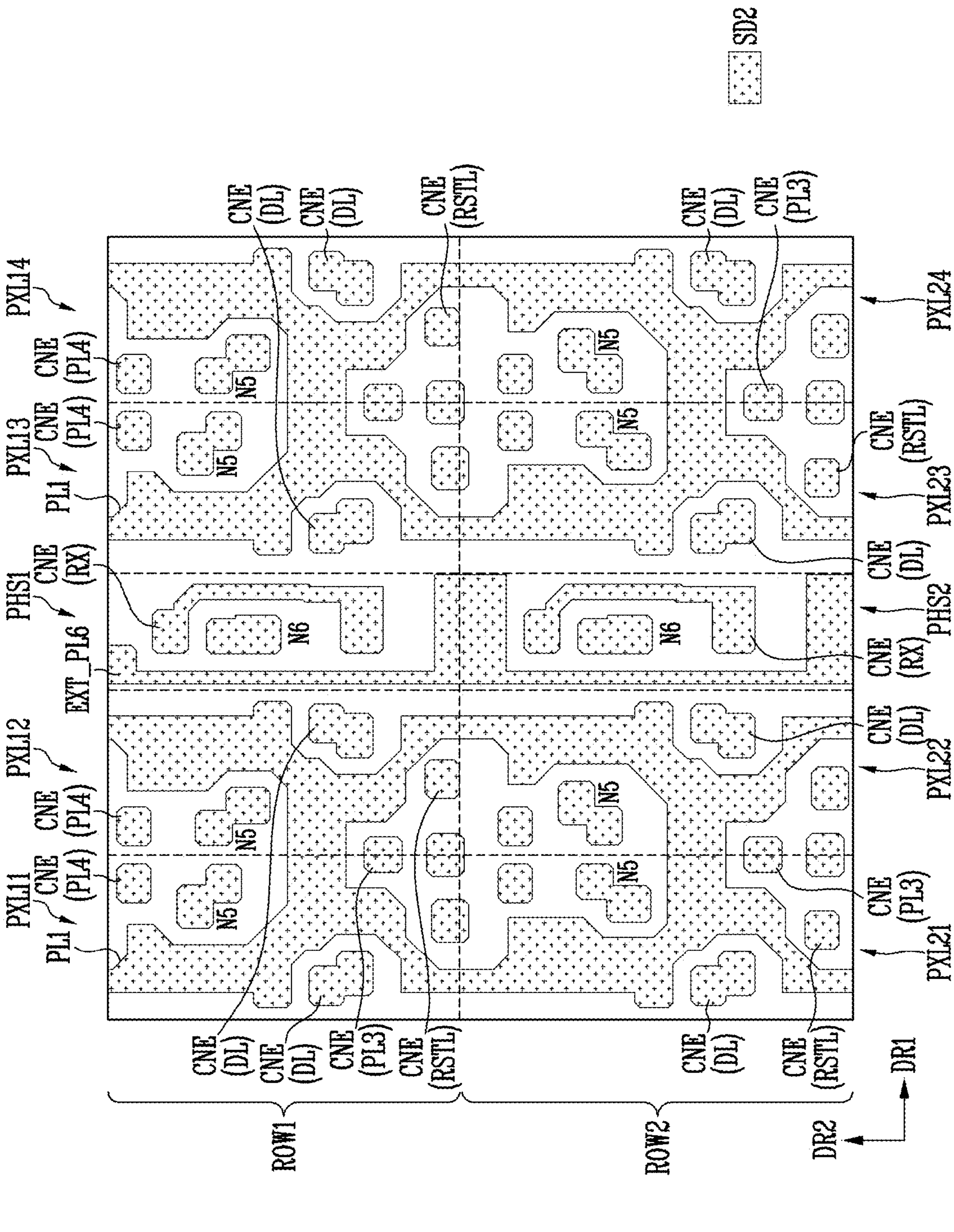
FIG. 18 is a layout view of a second source drain electrode.

FIG. 18 is a layout view of a second source drain electrode SD2.

The second source drain electrode SD2 may include a plurality of patterns.

The second source drain electrode SD2 may include the first power line PL1 and a sixth power line extension electrode EXT_PL6, which entirely extend in the second direction DR2.

According to some embodiments, further referring to FIG. 16, the sixth power line extension electrode EXT_PL6 may be configured to connect the sixth power line PL6 located on the second pixel row ROW2 to the sixth power line connection electrode CNE_PL6 located on the first pixel row ROW1.

The second source drain electrode SD2 may include a connection electrode CNE.

The second source drain electrode SD2 may include a connection electrode CNE entirely extending in the second direction DR2 inside each of the first and second photo sensors PHS1 and PHS2 to constitute the sensing line RX.

Meanwhile, the second source drain electrode SD2 constituting the sensing line RX may not be connected between the first photo sensor PHS1 and the second photo sensor PHS2. The sixth power line connection electrode CNE_PL6 may be located in a corresponding area.

The second source drain electrode SD2 may include a connection electrode CNE connected to the data line DL, the fourth power line PL4, the third power line PL3, and the reset control line RSTL.

The second source drain electrode SD2 may constitute the fifth node N5 and the sixth node N6.

The second source drain electrode SD2 may include a metal. The second source drain electrode SD2 may include a material having excellent conductivity. According to some embodiments, the second source drain electrode SD2 may include a conductive material including molybdenum (Mo), aluminum (Al), copper (Cu), titanium (Ti), and the like. The second source drain electrode SD2 may be formed in a multi-layer structure or a single-layer structure, which includes the above-described material. According to some embodiments, the second source drain electrode SD2 may have a multi-layer structure of Ti/Al/Ti.

A second insulating layer may be provided over the second source drain electrode SD2. For example, the second insulating layer may be an organic insulating layer including an organic material. The second insulating layer may include an organic insulating material, such as a general purpose polymer such as polymethylmethacrylate or polystyrene, a polymer derivative having a phenolic group, an acryl-based polymer, an imide-based polymer, an aryl ether-based polyimide, an amide-based polymer, a fluorine-based polymer, a p-xylene-based polymer, a vinyl alcohol-based polymer, or any blend thereof. The second insulating layer may perform a function of planarizing an area on the second source drain electrode SD2.

Figure 19:
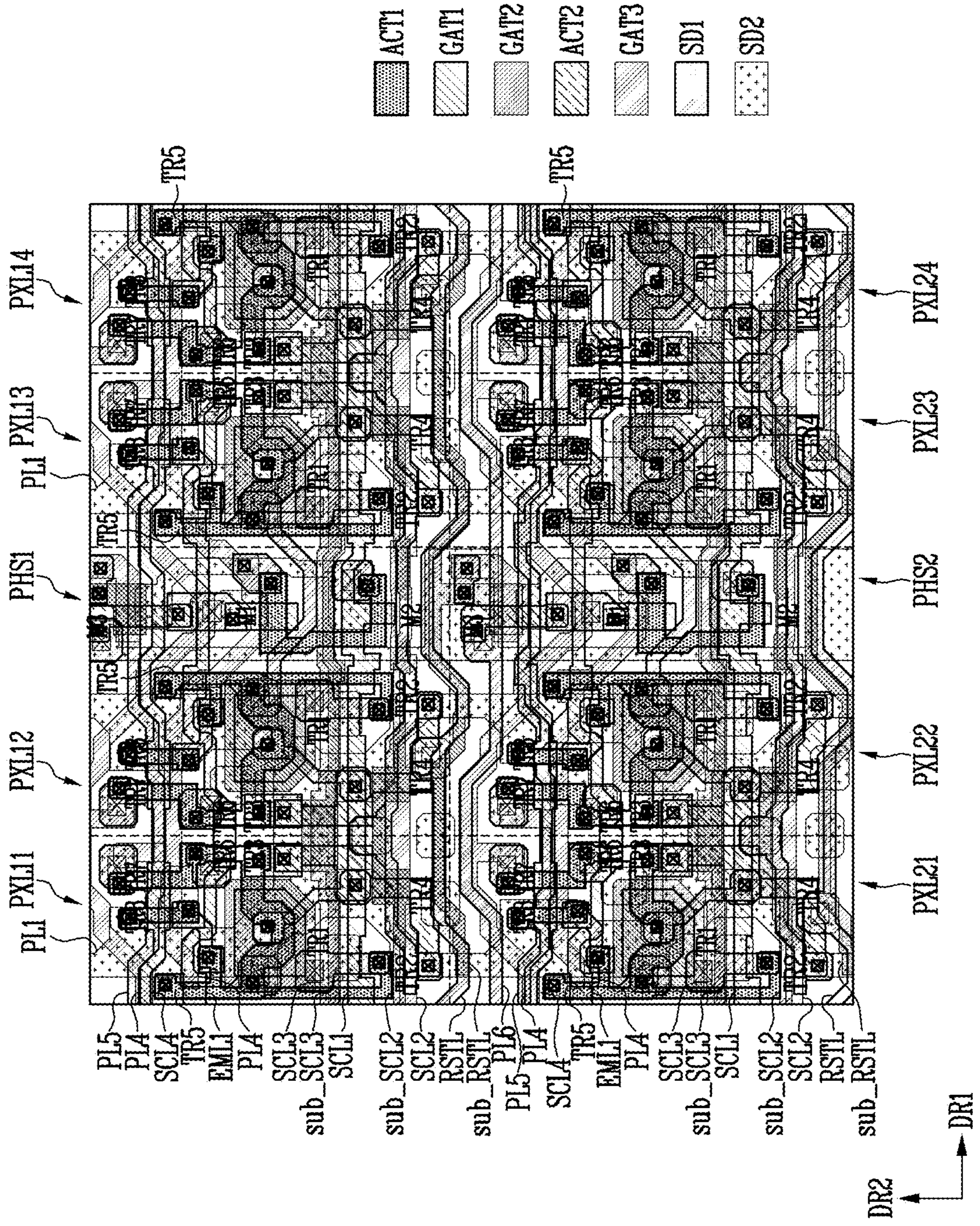
FIG. 19 is a stacked layout view of the first semiconductor layer, the first gate electrode layer, the second gate electrode layer, the second semiconductor layer, the third gate electrode layer, the first source drain electrode, and the second source drain electrode.

FIG. 19 is a stacked layout view of the first semiconductor layer ACT1, the first gate electrode layer GAT1, the second gate electrode layer GAT2, the second semiconductor layer ACT2, the third gate electrode layer GAT3, the first source drain electrode SD1, and the second source drain electrode SD2.

Referring to FIG. 19, the second source drain electrode SD2 may be connected to the first source drain electrode SD1 through a contact hole.

The sixth power line PL6 located on the second pixel row ROW2 and the third sensor transistor M3 located on the first pixel row ROW1 may be connected to each other by the second source drain electrode SD2.

Figure 20:
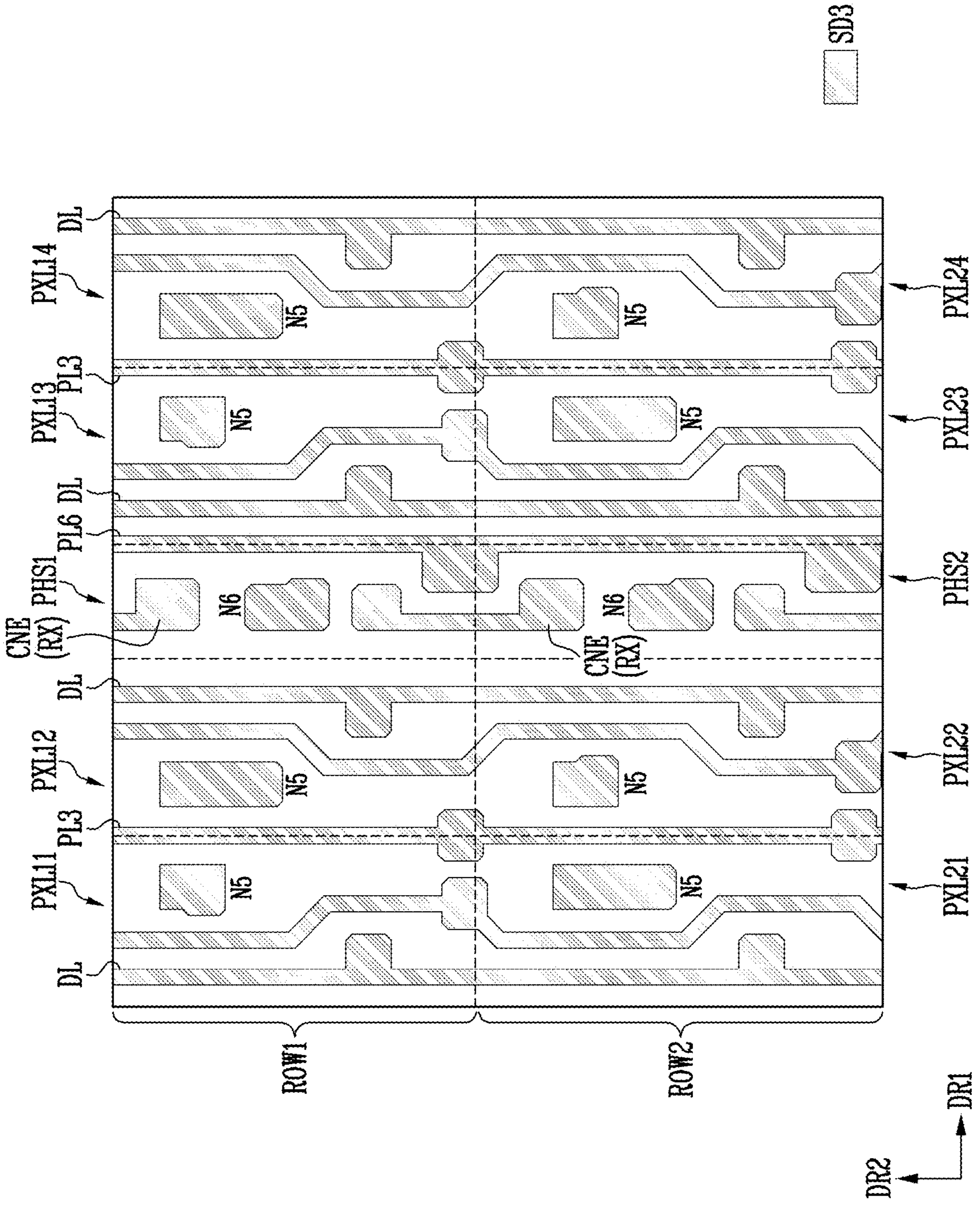
FIG. 20 is a layout view of a third source drain electrode.

FIG. 20 is a layout view of a third source drain electrode SD3.

The third source drain electrode SD3 may include a plurality of patterns.

Referring to FIG. 20, the third source drain electrode SD3 may constitute the data line DL, the third power line PL3, and the sixth power line PL6, which entirely extend in the second direction DR2.

The third source drain electrode SD3 may constitute a connection electrode CNE of the sensing line RX. The connection electrode CNE of the sensing line RX, which is configured with the third source drain electrode SD3, may be configured to connect the first photo sensor PHS1 and the second photo sensor PHS2 to each other.

The third source drain electrode SD3 constitute the fifth node N5 and the sixth node N6.

The third source drain electrode SD3 may include a metal. The third source drain electrode SD3 may include a material having excellent conductivity. According to some embodiments, the third source drain electrode SD3 may include a conductive material including molybdenum (Mo), aluminum (Al), copper (Cu), titanium (Ti), and the like. The third source drain electrode SD3 may be formed in a multi-layer structure or a single-layer structure, which includes the above-described material. According to some embodiments, the third source drain electrode SD3 may have a multi-layer structure of Ti/Al/Ti.

A third insulating layer may be provided over the third source drain electrode SD3. For example, the third insulating layer may be an organic insulating layer including an organic material. The third insulating layer may include an organic insulating material, such as a general purpose polymer such as polymethylmethacrylate or polystyrene, a polymer derivative having a phenolic group, an acryl-based polymer, an imide-based polymer, an aryl ether-based polyimide, an amide-based polymer, a fluorine-based polymer, a p-xylene-based polymer, a vinyl alcohol-based polymer, or any blend thereof. The third insulating layer may perform a function of planarizing an area on the third source drain electrode SD3.

Figure 21:
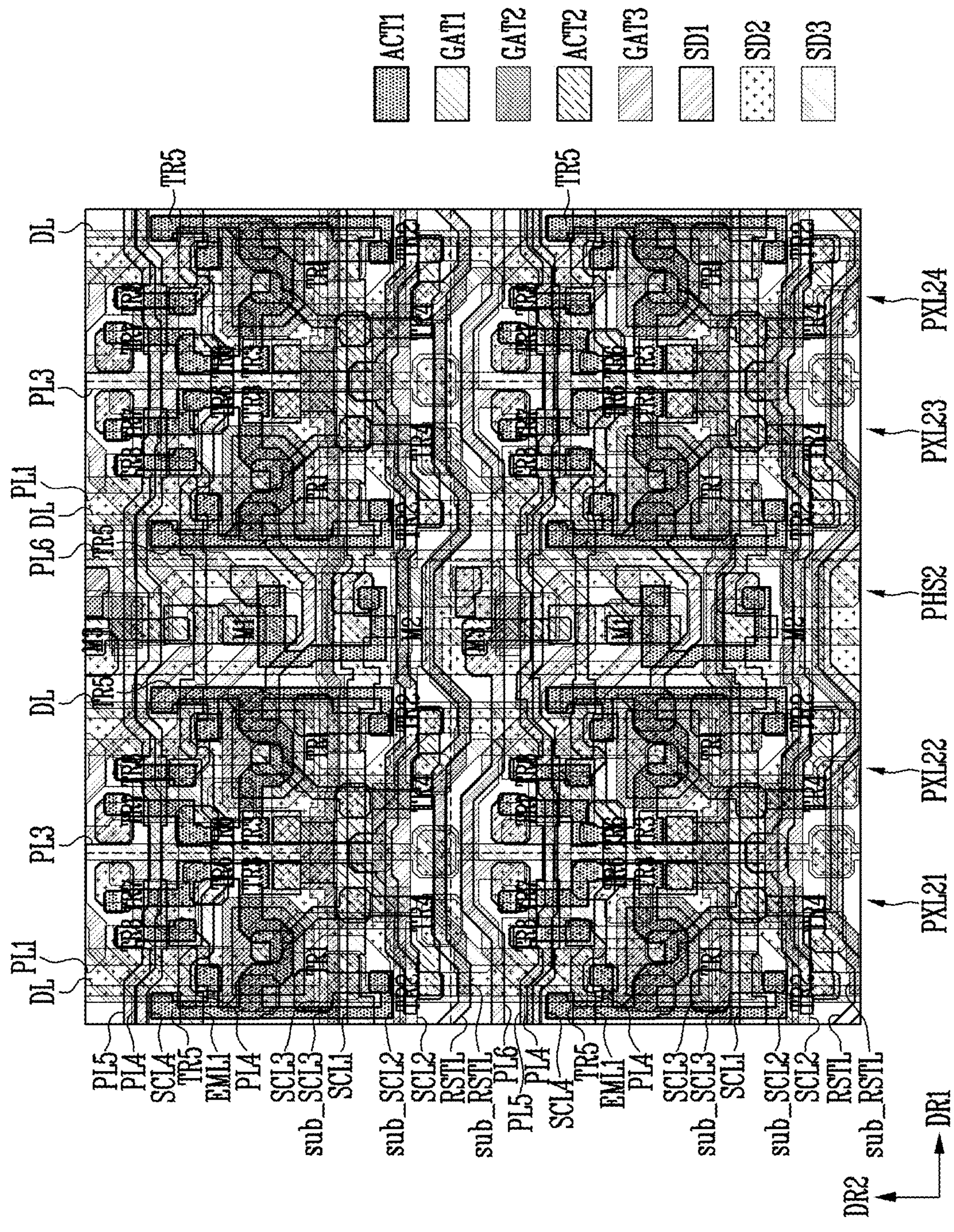
FIG. 21 is a stacked layout view of the first semiconductor layer, the first gate electrode layer, the second gate electrode layer, the second semiconductor layer, the third gate electrode layer, the first source drain electrode, the second source drain electrode, and the third source drain electrode.

FIG. 21 is a stacked layout view of the first semiconductor layer ACT1, the first gate electrode layer GAT1, the second gate electrode layer GAT2, the second semiconductor layer ACT2, the third gate electrode layer GAT3, the first source drain electrode SD1, the second source drain electrode SD2, and the third source drain electrode SD3.

Referring to FIG. 21, the third source drain electrode SD3 may be connected to the second source drain electrode SD2 through a contact hole.

Referring to FIG. 21, the pixel circuit PXC and the photo sensor circuit PSC, which are described through FIG. 5 and the like, can be implemented. Accordingly, the degree of integration of the pixel and the photo sensor can be increased.

Figure 22:
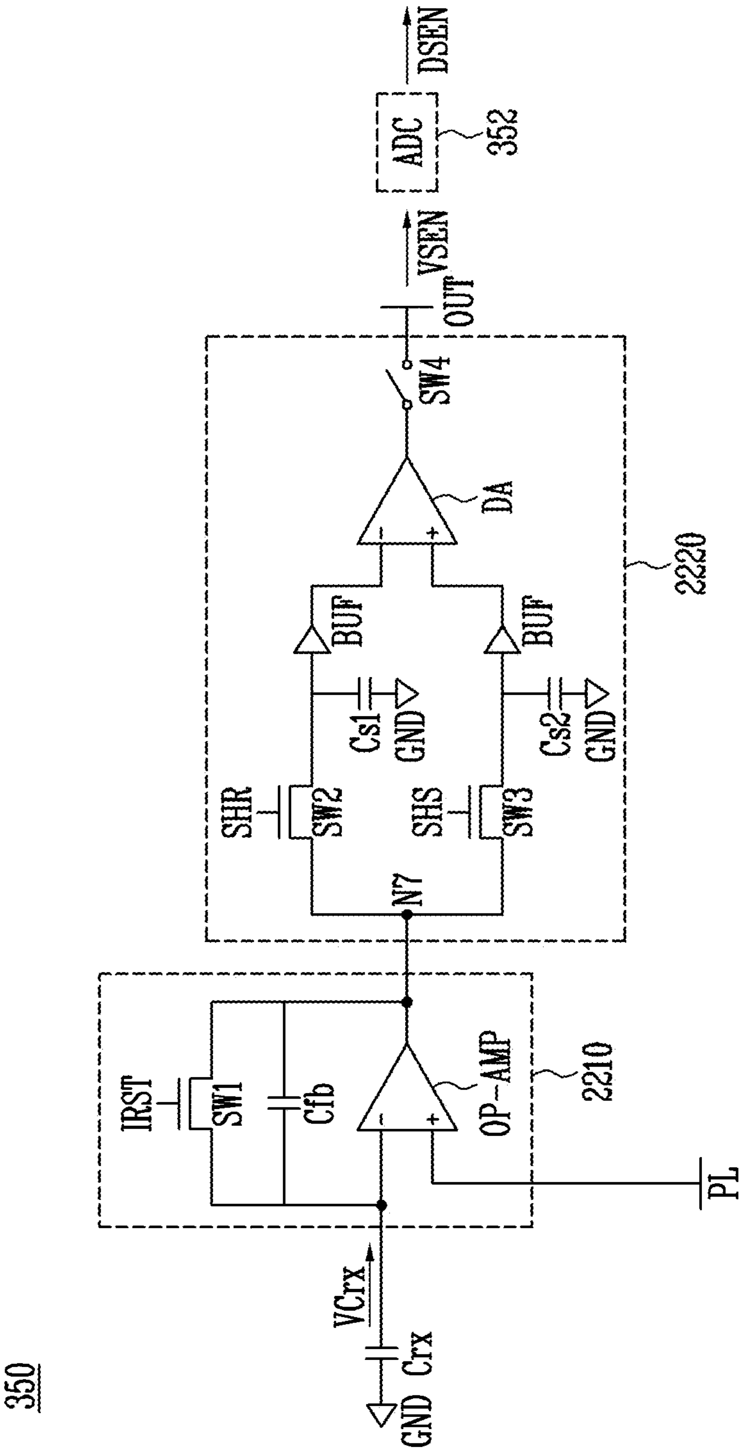
FIG. 22 is an equivalent circuit diagram of a readout circuit according to some embodiments of the present disclosure.

FIG. 22 is an equivalent circuit diagram of a readout circuit 350 according to some embodiments of the present disclosure.

Referring to FIG. 22, the readout circuit 350 according to some embodiments of the present disclosure may include an integrator 2210 and a sampling and holding circuit (or referred to as a correlated double sampling circuit) 2220.

The integrator 2210 may include an operational amplifier OP-AMP, a feedback capacitor Cfb, and a first switching element SW1. An operation timing of the first switching element SW1 may be controlled by an integrator reset signal IRST.

The operational amplifier OP-AMP may include a first input terminal (e.g., a (−) input terminal), a second input terminal (e.g., a (+) terminal), and an output terminal.

The first input terminal of the operational amplifier OP-AMP may be electrically connected to at least one of the plurality of sensing lines RX1 to RXo (see FIG. 3). To this end, a multiplexer may be further located between the first input terminal of the operational amplifier OP-AMP and the plurality of sensing lines. A voltage VCrx from one electrode of a capacitor Crx corresponding to a voltage of a sensing line in the equivalent circuit diagram may be applied to the first input terminal of the operational amplifier OP-AMP. A ground voltage GND may be applied to the other electrode of the capacitor Crx in the equivalent circuit diagram.

The second input terminal of the operational amplifier OP-AMP may be electrically connected to a power line PL to which a constant voltage is applied. According to some embodiments, the power line PL may be grounded. However, embodiments of the present disclosure are not limited thereto.

The feedback capacitor Cfb may include one electrode electrically connected to the first input terminal of the operational amplifier OP-AMP and the other electrode connected to the output terminal of the operational amplifier OP-AMP.

The first switching element SW1 may be configured to switch an electrical connection between the first input terminal and the output terminal of the operational amplifier OP-AMP. When the first switching element SW1 is turned on, charges stored in the feedback capacitor Cfb may be discharged, and the feedback capacitor Cfb may be reset.

The sampling and holding circuit 2220 may include a second switching element SW2, a third switching element SW3, a first sampling capacitor Cs1, a second sampling capacitor Cs2, a differential amplifier DA, a fourth switching element SW4, and the like. The sampling and holding circuit 2220 may include a seventh node N7 electrically connected to an output terminal of the integrator 2210 (e.g., the output terminal of the operational amplifier OP-AMP). According to some embodiments of the present disclosure, the sampling and holding circuit 2220 may be configured to store a value obtained by sensing the photo sensor and output an analog voltage obtained by removing (or reducing) a noise component from the sensed value.

The second switching element SW2 may be configured to switch an electrical connection between the seventh node N7 and the first sampling capacitor Cs1. An operation timing of the second switching element SW2 may be controlled in response to a second sampling signal SHR.

The first sampling capacitor Cs1 may be configured to store a value corresponding to a noise component. The noise component may include, for example, a noise component basically existing in a sensing line (e.g., RXk (see FIG. 5). According to some embodiments, the first sampling capacitor Cs1 may include one electrode electrically connected to the second switching element SW2 and the other electrode to which the ground voltage GND is applied.

The third switching element SW3 may be configured to switch an electrical connection between the seventh node N7 and the second sampling capacitor Cs2. An operation timing of the third switching element SW3 may be controlled in response to a first sampling signal SHS.

The second sampling capacitor Cs2 may be configured to store a value obtained by sensing the photo sensor, including a noise component. The second sampling capacitor Cs2 may include one electrode electrically connected to the third switching element SW3 and the other electrode to which the ground voltage GND is applied.

The differential amplifier DA may include a first input terminal (e.g., a (−) input terminal), a second input terminal (e.g., a (+) input terminal), and an output terminal. The differential amplifier DA may be configured to amplify and output a signal corresponding to a difference between a signal input to the second input terminal and a signal input to the first input terminal.

The first input terminal of the differential amplifier DA may be configured to receive a voltage applied from the first sampling capacitor Cs1. A buffer BUF may be further located between the first input terminal of the differential amplifier DA and the first sampling capacitor Cs1.

The second input terminal of the differential amplifier DA may be configured to receive a voltage applied from the second sampling capacitor Cs2. A buffer BUF may be further located between the second input terminal of the differential amplifier DA and the second sampling capacitor Cs2.

The fourth switching element SW4 may be configured to switch an electrical connection between the output terminal of the differential amplifier DA and an input terminal OUT of the ADC 352. When the fourth switching element SW4 is turned on, a sensing voltage VSEN corresponding to a light receiving amount of the photo sensor may be input to the ADC 352.

The second switching element SW2 and the third switching element SW3 may correspond to a switching element for sampling of a signal. The fourth switching element SW4 may correspond to a switching element for holding of the signal.

The ADC 352 may convert the input sensing voltage VSEN into a digital value, and output the converted digital value DSEN.

In the display device, the electronic device, and the method of manufacturing the same according to some embodiments of the present disclosure, a power line can be relatively efficiently arranged or formed.

Aspects of some embodiments of the present disclosure have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the appended claims, and their equivalents.

What is claimed is:

1. A display device comprising:

a first pixel;

a first photo sensor adjacent to the first pixel in a first direction, the first photo sensor including a photo sensor circuit;

a second pixel adjacent to the first pixel in a second direction, wherein the second direction is different from the first direction;

a second photo sensor adjacent to the second pixel in the first direction, the second photo sensor including a photo sensor circuit;

a power line entirely extending in the first direction and configured to receive a reset voltage, the power line being directly connected to the photo sensor circuit of the second photo sensor;

a power line connection electrode in an island shape, the power line connection electrode being directly connected to the photo sensor circuit of the first photo sensor; and a power line extension electrode connected to the power line, the power line extension electrode entirely extending in the second direction, the power line extension electrode being directly connected to the power line connection electrode.

2. The display device of claim 1, wherein the power line is a sixth power line, wherein each of the first photo sensor and the second photo sensor includes a light receiving element, wherein each of the photo sensor circuit of the first photo sensor and the photo sensor circuit of the second photo sensor includes:

a first sensor transistor including a gate electrode connected to the light receiving element at a sixth node, and the first sensor transistor being connected to a fourth power line;

a second sensor transistor connected between the first sensor transistor and a sensing line; and a third sensor transistor including a gate electrode connected to a reset control line, the third sensor transistor being connected between the sixth node and the sixth power line, and wherein the light receiving element is connected to the sixth node and a second power line.

3. The display device of claim 2, wherein the sixth power line includes a first source drain electrode connected to a semiconductor layer of the third sensor transistor.

4. The display device of claim 3, wherein at least a portion of the sixth node is configured with the first source drain electrode.

5. The display device of claim 3, wherein the power line extension electrode is configured with a second source drain electrode, and wherein the second source drain electrode is on the first source drain electrode.

6. The display device of claim 5, wherein at least a portion of the sixth node is configured with the second source drain electrode.

7. The display device of claim 5, wherein the sensing line includes a third source drain electrode, and wherein the third source drain electrode is located on the second source drain electrode.

8. The display device of claim 7, wherein the sensing line includes a connection electrode configured with the first source drain electrode, a connection electrode configured with the second source drain electrode, and a connection electrode configured with the third source drain electrode.

9. The display device of claim 8, wherein the connection electrode configured with the first source drain electrode and the connection electrode configured with the second source drain electrode in the sensing line are located inside each of the photo sensor circuit of the first photo sensor and the photo sensor circuit of the second photo sensor.

10. The display device of claim 9, wherein the connection electrode configured with the third source drain electrode in the sensing line is located between the photo sensor circuit of the first photo sensor and the photo sensor circuit of the second photo sensor.

11. The display device of claim 2, wherein each of the first pixel and the second pixel includes a pixel circuit and a light emitting element connected to the pixel circuit, wherein the pixel circuit includes:

a first pixel transistor connected between a first node and a second node, the first pixel transistor including a gate electrode connected to a fourth node;

a second pixel transistor configured to switch an electrical connection between the first node and a data line in response to a first scan signal applied to a first scan line;

a third pixel transistor connected between the second node and the fourth node;

a fourth pixel transistor connected between the fourth node and a third power line;

a fifth pixel transistor connected between a first power line and the first node;

a sixth pixel transistor connected between the second node and a fifth node;

a seventh pixel transistor connected between the fifth node and the fourth power line;

an eighth pixel transistor connected between a fifth power line and the first node;

a first capacitor including a first electrode connected to the fourth node and a second electrode connected to the first power line; and a second capacitor including a first electrode connected to the fourth node and a second electrode connected to the first scan line, and wherein the light emitting element is connected between the fifth node and the second power line.

12. The display device of claim 11, wherein each of the first, second, and fifth to eighth pixel transistors and the first and second sensor transistors includes a first semiconductor layer.

13. The display device of claim 12, wherein each of the third and fourth pixel transistors and the third sensor transistor includes a second semiconductor layer, and wherein the second semiconductor layer is located on the first semiconductor layer.

14. The display device of claim 1, wherein the first pixel and the first photo sensor are in a first pixel row, and the second pixel and the second photo sensor are in a second pixel row, and wherein the first pixel and the second pixel are in a first pixel column, and the first photo sensor and the second photo sensor are in a sensor column.

15. An electronic device comprising the display device of claim 1, wherein the electronic device is one of a mobile phone, a personal digital assistant (PDA), a smartphone, a wireless modulator-demodulator (MODEM), or a notebook computer.

16. A method of manufacturing a display device including a first photo sensor on a first pixel row and a second photo sensor on a second pixel row, the method comprising:

forming a first semiconductor layer on a substrate, wherein the first semiconductor layer constitutes a semiconductor layer of each of a first sensor transistor and a second sensor transistor of each of the first photo sensor and the second photo sensor;

forming a first gate electrode layer on the first semiconductor layer, wherein the first gate electrode layer constitutes a gate electrode of each of the first sensor transistor and the second sensor transistor;

forming a second semiconductor layer on the first gate electrode layer, wherein the second semiconductor layer constitutes a semiconductor layer of a third sensor transistor of each of the first photo sensor and the second photo sensor;

forming a second gate electrode layer on the second semiconductor layer, wherein the second gate electrode layer constitutes a gate electrode of the third sensor transistor;

forming a first source drain electrode on the second gate electrode layer, wherein the first source drain electrode includes a power line which extends in a first direction on the second pixel row and is connected to the second semiconductor layer and a power line connection electrode which is located on the first pixel row and is connected to the second semiconductor layer; and forming a second source drain electrode on the first source drain electrode, wherein the second source drain electrode includes a power line extension electrode extending in a second direction different from the first direction, the power line extension electrode being connected to the power line and the power line connection electrode.

17. The method of claim 16, wherein the first semiconductor layer includes a silicon semiconductor.

18. The method of claim 16, wherein the second semiconductor layer includes an oxide semiconductor.

19. The method of claim 16, further comprising forming a third source drain electrode on the second source drain electrode, wherein the third source drain electrode extends in the second direction, and is connected to the power line extension electrode.

20. The method of claim 19, wherein the first photo sensor and the second photo sensor are commonly connected to one sensing line, and wherein the sensing line is configured with the first source drain electrode, the second source drain electrode, and the third source drain electrode.

* * * * *